US012276771B2

(12) United States Patent
Crowley et al.

(10) Patent No.: US 12,276,771 B2
(45) Date of Patent: Apr. 15, 2025

(54) SYSTEM AND METHOD FOR DETERMINING CHARACTERISTICS OF TRAVELING IONOSPHERIC DISTURBANCES

(71) Applicant: Atmospheric & Space Technology Research Associates LLC, Boulder, CO (US)

(72) Inventors: Geoffrey Crowley, Lafayette, CO (US); Adam Reynolds, Broomfield, CO (US)

(73) Assignee: Atmospheric & Space Technology Research Associates LLC, Boulder, CO (US)

( * ) Notice: Subject to any disclaimer, the term of this patent is extended or adjusted under 35 U.S.C. 154(b) by 570 days.

(21) Appl. No.: 17/572,317

(22) Filed: Jan. 10, 2022

(65) Prior Publication Data

US 2022/0128732 A1 Apr. 28, 2022

Related U.S. Application Data

(62) Division of application No. 14/428,637, filed as application No. PCT/US2013/072700 on Dec. 2, 2013, now Pat. No. 11,221,433.

(60) Provisional application No. 61/732,229, filed on Nov. 30, 2012.

(51) Int. Cl.
| | |
|---|---|
| *G01S 1/08* | (2006.01) |
| *G01S 19/07* | (2010.01) |
| *G01W 1/00* | (2006.01) |
| *G01S 19/32* | (2010.01) |

(52) U.S. Cl.
CPC ............... *G01W 1/00* (2013.01); *G01S 19/07* (2013.01); *G01S 19/32* (2013.01)

(58) Field of Classification Search
CPC ......... G01W 1/00; G01S 19/07; G01S 17/894
See application file for complete search history.

(56) References Cited

U.S. PATENT DOCUMENTS

| | | | |
|---|---|---|---|
| 4,463,357 A | 7/1984 | Macdoran | |
| 6,914,553 B1* | 7/2005 | Beadle | G01S 13/90 342/134 |
| 7,277,797 B1 | 10/2007 | Kunitsyn et al. | |

(Continued)

FOREIGN PATENT DOCUMENTS

| | | |
|---|---|---|
| EP | 0242115 B1 | 3/1994 |
| EP | 0946920 B1 | 3/2005 |
| EP | 1641145 A1 | 3/2006 |

OTHER PUBLICATIONS

Chao-Song H., et al., "Basic Properties and Gravity wave Initiation of the Midlatitude F Region Instability," Radio Science, vol. 29(1), Jan.-Feb. 1994, 11 pages.

(Continued)

*Primary Examiner* — Lam S Nguyen
(74) *Attorney, Agent, or Firm* — Morrison & Foerster LLP

(57) ABSTRACT

The present invention generally relates to a system and method for determining characteristics of traveling ionospheric disturbances (TIDs), and more particularly to a method and system for real time mapping of corresponding ionospheric perturbations, where in the case where the amplitude of each wave represents a height change, then the output field is truly a three dimensional representation of the height perturbations of an iso-ionic contour caused by the TIDs.

8 Claims, 14 Drawing Sheets

(56) References Cited

U.S. PATENT DOCUMENTS

| | | |
|---|---|---|
| 7,471,241 B1 | 12/2008 | Yang |
| 7,598,901 B2* | 10/2009 | Tillotson .................. G01P 5/26 342/26 B |
| 2003/0142011 A1 | 7/2003 | Abramovich et al. |
| 2007/0008216 A1 | 1/2007 | Ganguly et al. |
| 2007/0127315 A1 | 6/2007 | Tompkins |
| 2007/0273574 A1 | 11/2007 | Barnum |

OTHER PUBLICATIONS

Cowling D H., et al., "Group Rays of Internal Gravity Waves in a Wind-Stratified Atmosphere," Journal of Geophysical Research, , Jan. 1971, vol. 76(1), 8 pages.

Crowley G., "A Synoptic Study of TIDs Observed in the United Kingdom during the First WAGS Campaign, Oct. 1985," Radio Science, vol. 23(6), Nov.-Dec. 1988, 13 pages.

Crowley G., "Doppler Radar Studies of the Antarctic Ionosphere," PHD Thesis, University of Leicester, Leicester, U. K., Jan. 1985, 275 pages.

Crowley G., "Dynamics of the Earth's Thermosphere: A Review," Reviews of Geophysics, Supplement, Apr. 1991, 23 pages.

Crowley G., et al., "Characteristics of Traveling Ionospheric Disturbances Observed by the TIDDBIT Sounder," Radio Science, vol. 47, Jun. 9, 2012, 12 pages.

Crowley G., et al., "Comparison of Short Period TID Morphologies in Antarctica during Geomagnetically Quiet and Active Intervals," Journal of Atmospheric and Terrestrial Physics, 1987, vol. 49, (11/12), 8 pages.

Crowley G., et al., "Determination of the Vertical Neutral Temperature and Wind Profiles using EISCAT and HF Doppler Radar," Journal of Atmospheric and Terrestrial Physics, 1984, vol. 46 (6-7), 7 pages.

Crowley G., et al., "Large Simultaneous Disturbances (LSDs) in the Antarctic Ionosphere," Journal of Atmospheric and Terrestrial Physics, 1984, vol. 46 (10), 9 pages.

Crowley G., et al., "Observations of the Source and Propagation of Atmospheric Gravity Waves," Letters to 16, Jul. 16, 1987, vol. 328, 3 pages.

Crowley G., et al., "Thermospheric Density Enhancements in the Dayside Cusp Region during Strong by Conditions," Geophysical Research Letters, 2010, vol. 37, 5 pages.

Earle G.D., et al., "A Comprehensive Rocket and Radar Study of Midlatitude Spread F," Journal of Geophysical Research, 2010, vol. 115, 21 pages.

Earle G.D., et al., "Satellite-based Measurements of Gravity Wave-induced Midlatitude Plasma Density Perturbations," Journal of Geophysical Research, 2008, vol. 113, 7 pages.

Fesen C.G., et al., "Lonospheric Effects at Low Latitudes During the Mar. 22, 1979, Geomagnetic Storm," Journal of Geophysical Research, May 1, 1989, vol. 94 (A5), 13 pages.

Francis P., "Spread F and Ionospheric Currents," Journal of Geophysical Research, Jan. 1, 1973, vol. 78 (1), 9 pages.

Fritts D.C., et al., "Gravity Wave and Tidal Influences on Equatorial Spread F based on Observations during the Spread F Experiment (SpreadFEx)," Annales Geophysicae, vol. 26, 2008, 18 pages.

Georges T.M., "HF Doppler Studies of Traveling Ionospheric Disturbances," Journal of Atmospheric and Terrestrial Physics, 1968, vol. 30, 16 pages.

Hajj G., et al., "Cosmic GPS Ionospheric Sensing and Space Weather," 2000, TAO, vol. 11(1), 38 pages.

Hickey M.P., et al., "Propagation of Tsunami-driven Gravity Waves into the Thermosphere and Ionosphere," Journal of Geophysical Research, 2009, vol. 114(A8), pp. 1-15.

Hines C.O., "An Interpretation of Certain Ionospheric Motions in Terms of Atmospheric Waves," Journal of Geophysical Research, 1959, vol. 64(12), pp. 2210-2211.

Hines C.O., "Internal Atmospheric Gravity Waves at Ionospheric Heights," Journal of Physics, 1960, vol. 38(11), pp. 1441-1481.

Hines C.O., "The Upper Atmosphere in Motion," Geophysical Monograph Series, 1974, vol. 18, pp. 1-80.

Ho C. M., et al., "Global Ionospheric Perturbations Monitored by the Worldwide GPS Network," Geophysical Research Letters, 1996, vol. 23(22), pp. 3219-3222.

Hocke K., et al., "A Review of Atmospheric Gravity Waves and Travelling Ionospheric Disturbances: 1982-1995," Annales Geophysical, 1996, vol. 4, pp. 917-940.

International Preliminary Report issued in Application No. PCT/US2013/072700, mailed on Jun. 11, 2015, 9 pages.

International Search Report for International (PCT) Patent Application No. PCT/US2013/072700, mailed Mar. 4, 2014, 2 pgs.

Kelley M.C., et al., "Gravity Wave Initiation of Equatorial Spread F: A Case Study," Journal of Geophysical Research, 1981, vol. 86, 14 pages.

Makela J.J., et al., "Periodic Spacing between Consecutive Equatorial Plasma Bubbles," Geophysical Research Letters, vol. 37, 2010, 5 pages.

Michael K., "Electrodynamics of Midlatitude Spread F 3. Electrohydrodynamic Waves? A New Look at the Role of Electric Fields in Thermospheric Wave Dynamics," Journal of Geophysical Research, vol. 102(A6), Jun. 1, 1997, 9 pages.

Michael K., "In Situ Ionospheric Observations of Severe Weather-related Gravity Waves and Associated Small-scale Plasma Structure," Journal of Geophysical Research, vol. 102(A1), Jan. 1, 1997, 7 pages.

Michael K., "Turburlent Upwelling of the Mid-Latitude Ionosphere 2. Theroretical Framework," Journal of Geophysical Research, vol. 96(A3), Mar. 1, 1991, 7 pages.

Michael N., et al., "Strong Evidence for Gravity Wave Seeding of an Ionospheric Plasma Instability," Geophysical Research Letters, vol. 32, 2005, 4 pages.

Miller C.A., et al., "Electrodynamics of Midlatitude Spread F 1. Observations of Unstable, Gravity Wave-induced Ionospheric Electric Fields at Tropical Latitudes," Journal of Geophysical Research, vol. 102(A6), Jun. 1, 1997, 12 pages.

Robert H., "Atmospheric Gravity Waves Generated in the High-Latitude Ionosphere: A Review," Reviews of Geophysics and Space Physics, vol. 20, No. 2, May 1982, 23 pages.

Roble R.G., et al., "A Thermosphere Ionosphere Mesosphere Electrodynamics General Circulation Model (Time-GCM): Equinox Solar Cycle Minimum Simulations (30-500 km)," Geophysical Research Letters, 1994, vol. 21, pp. 1-4.

Saito A., et al., "Traveling Ionospheric Disturbances Detected in the Front Campaign," Geophysical Research Letters, 2001, vol. 28(4), pp. 1-4.

Samuel F., "Global Propagation of Atmospheric Gravity Waves: A Review," Journal of Atmospheric and Terrestrial Physics, 1975, vol. 37, pp. 1-45.

Sharon V., et al., "Sources of the Traveling Ionospheric Disturbances Observed by the Ionospheric Tiddbit sounder near Wallops Island on Oct. 30, 2007," Journal of Geophysical Research, 2010, vol. 115, pp. 1-24.

Sharon V., et al., "Thermospheric Responses to gravity waves: Influences of Increasing Viscosity and Thermal Diffusivity," Journal of Geophysical Research, 2005, vol. 110, pp. 1-16.

Sharon V., "Horizontal and Vertical Propagation and Dissipation of Gravity Waves in the Thermosphere from Lower Atmospheric and Thermospheric Sources," Journal of Geophysical Research, 2007, vol. 112, pp. 1-23.

Thomas I., et al., "Dayside Enhancements of Thermospheric O/N2 following Magnetic Storm Onset," Journal of Geophysical Research, 2001, vol. 106(A8), pp. 1-18.

Vadas S L., et al., "Convection: The Likely Source of the Medium-scale Gravity Waves Observed in the OH Airglow Layer near Brasilia, Brazil, during the SpreadFEx campaign," Annales Geophysicae, 2009, 29 pages.

Waldock J A., et al., "Source Regions of Medium Scale Travelling Ionospheric Disturbances Observed at Mid-latitudes," Journal of Atmospheric and Terrestrial Physics, 1987, vol. 49(2), 10 pages.

Walterscheid R L., et al., "Small-scale Gravity Waves in the Upper Mesosphere and Lower thermosphere Generated by Deep Tropical Convection," Journal of Geophysical Research, Dec. 16, 2001, vol. 106(D23), 8 pages.

(56) References Cited

OTHER PUBLICATIONS

Written Opinion for International (PCT) Patent Application No. PCT/US2013/072700, mailed Mar. 4, 2014, 7 pages.

* cited by examiner

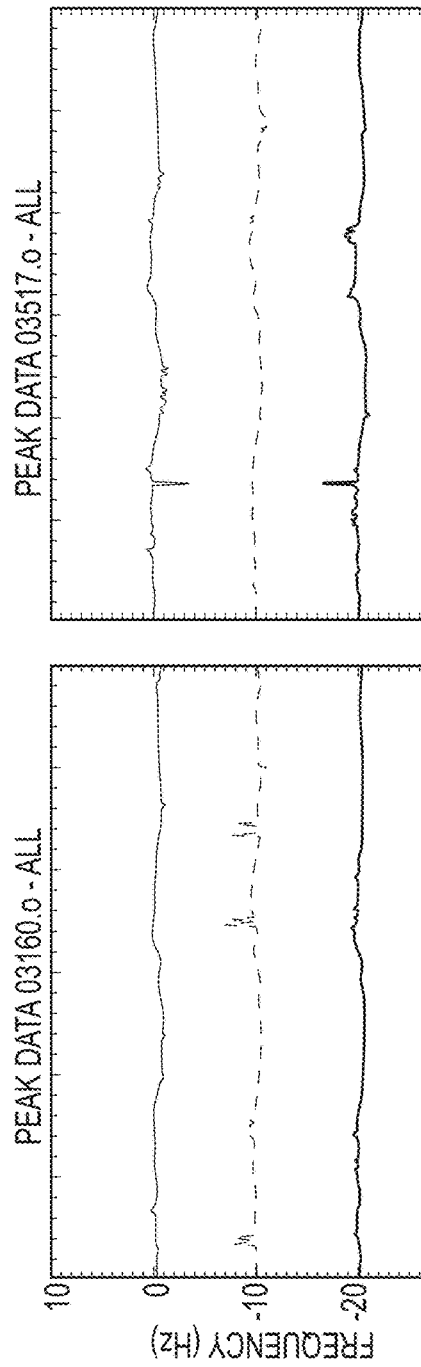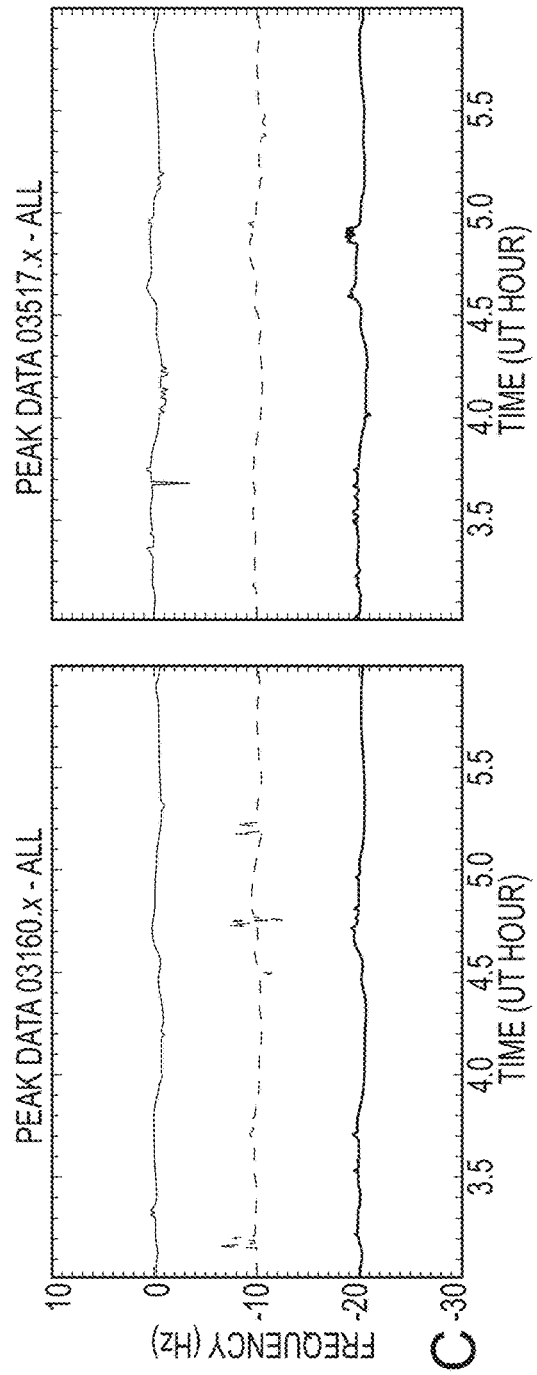

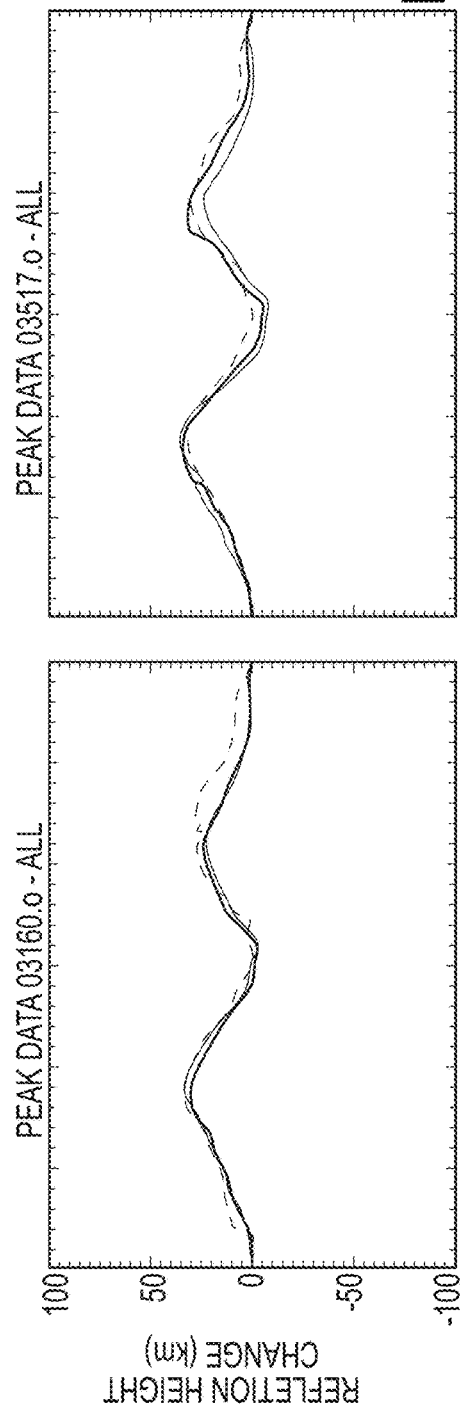
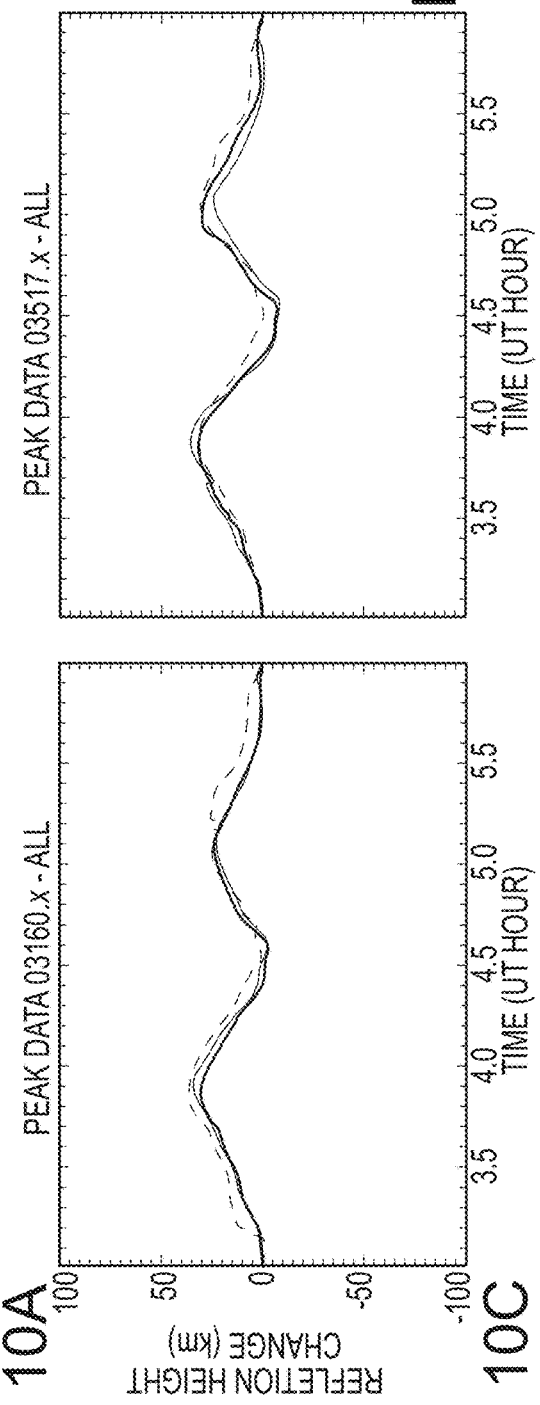
FIG. 10A  FIG. 10B  FIG. 10C  FIG. 10D

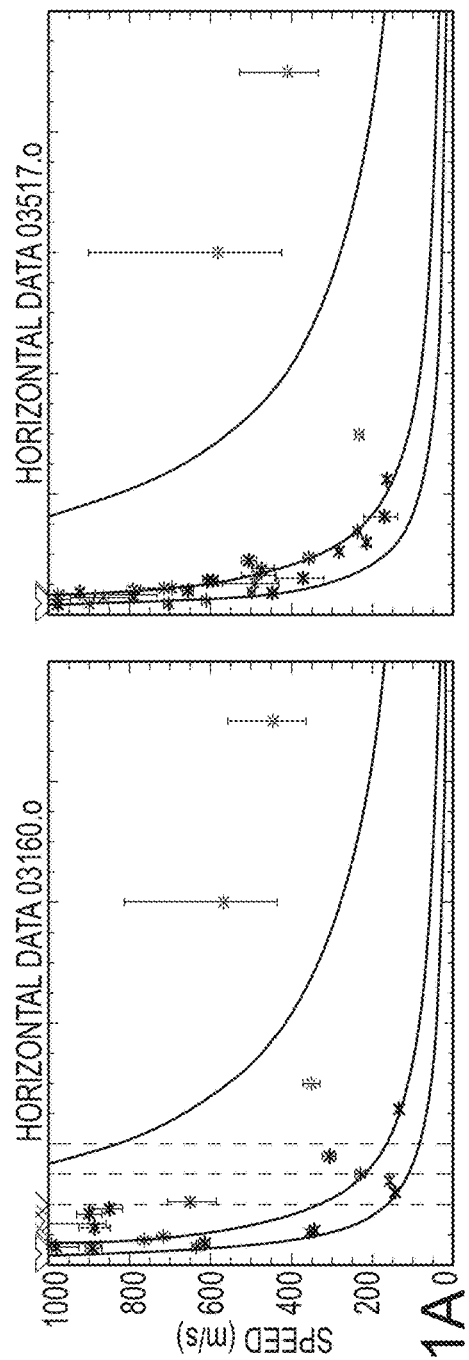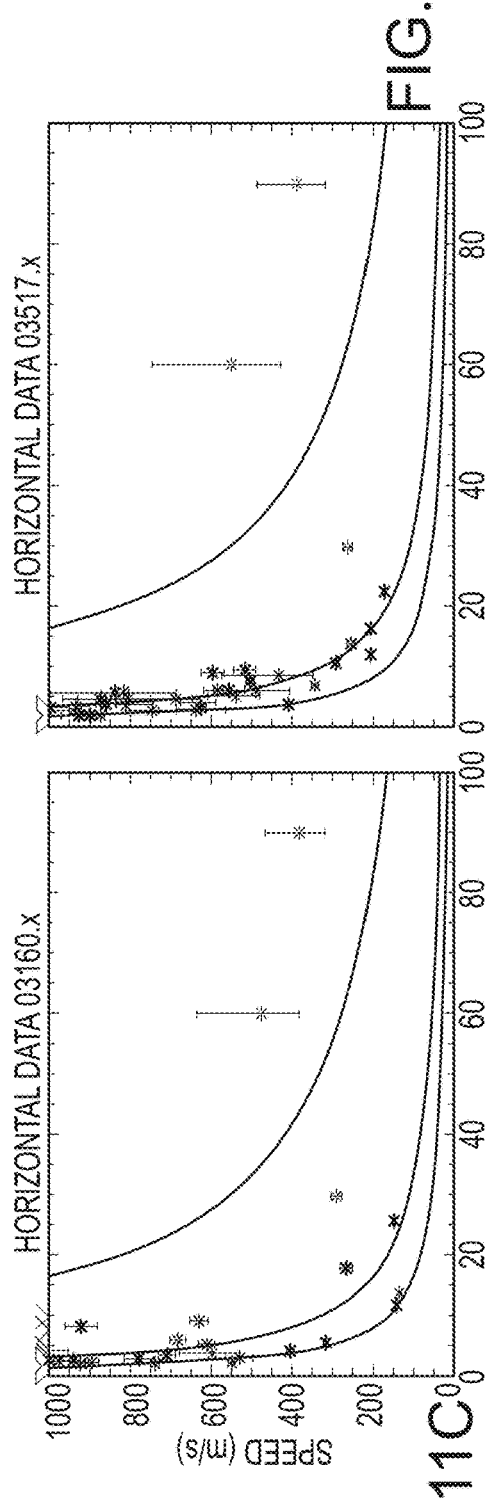
FIG. 11A  FIG. 11B  FIG. 11C  FIG. 11D

SYSTEM AND METHOD FOR DETERMINING CHARACTERISTICS OF TRAVELING IONOSPHERIC DISTURBANCES

This application is a divisional application of U.S. patent application Ser. No. 14/428,637 filed on Mar. 16, 2015, which is a national stage application, under 35 U.S.C. § 371, of International Application No. PCT/US2013/072700 having an international filing date of Dec. 2, 2013, which claims the benefit of U.S. Provisional Patent Application No. 61/732,229 filed on Nov. 30, 2012, each of the above-identified applications are being fully incorporated herein by reference.

BACKGROUND OF THE INVENTION

Field of the Invention

The present invention generally relates to a system and method for determining characteristics of traveling ionospheric disturbances (TIDs), and more particularly to a method and system for real time mapping of corresponding ionospheric perturbations. In the case where the amplitude of each wave represents a height change, then the output field is truly a 3-D representation of the height perturbations of an iso-ionic contour caused by the TIDs.

Discussion of the Related Art

A better understanding of atmospheric gravity waves (AGW) activity and their propagation characteristics is important for a better qualitative assessment of the coupling between different atmospheric regions. AGWs transport energy and momentum from high to low latitudes and from low to high altitudes. A broad spectrum of AGWs can be generated by numerous lower atmospheric processes, such as storms (e.g. Kelley, 1997; Walterscheid et al., 2001) and auroral processes (Crowley and Williams, 1987; Fesen et al., 1989; Crowley, 1991; Immel et al., 2001). A portion of the AGW spectrum can break in the mesosphere depositing its energy and momentum in that region, and leading to the formation of the cold summer mesopause. Other parts of the wave spectrum can propagate into the thermosphere (Waldock and Jones, 1987; Vadas, 2007) where they play important roles in thermospheric and ionospheric dynamics.

Special attention has been given to AGW propagation and investigation of the waves that can reach the thermosphere (e.g. Waldock and Jones, 1987; Vadas, 2007). These AGWs are believed to serve as sources for the initial electron density perturbations required by mid- and low-latitude plasma instabilities producing spread F events (e.g. Kelley et al., 1981; Huang et al., 1994; Nicolls and Kelley, 2005; Fritts et al., 2008). Strong spread F events have been associated with disruption of satellite-based navigation/communication radio links. AGWs and equatorial spread F events were the subject of a comprehensive theoretical and multi-instrumented experimental research campaign carried out in Brazil during 2005 (Vadas et al., 2009).

Despite the importance of AGW in the thermosphere, experimental studies have been limited, because of the scarcity of direct neutral density and/or wind measurements at thermospheric heights. Estimates of the AGW characteristics have been obtained through indirect measurements of the AGW effects in the ionized medium.

There is a need for a system and method for determining characteristics of traveling ionospheric disturbances, and more particularly for a method and system for a real time three dimensional representation of the height perturbations of an iso-ionic contour caused by the TIDs.

SUMMARY OF THE INVENTION

Accordingly, the invention is directed to a system and method for determining characteristics of traveling ionospheric disturbances, and producing a three dimensional representation of the height perturbations of an iso-ionic contour caused by the TIDs, that substantially obviates one or more of the problems due to limitations and disadvantages of the related art.

An advantage of an embodiment of the invention is to provide sufficient wave information as a function of wave period to completely characterize the dominant spectral components of the TID spectrum, including their amplitudes and both the horizontal and vertical phase trace velocities.

Another advantage of an embodiment of the invention is to provide Doppler shift amplitude and corresponding height perturbations as a function of TID period using an HF Sounder System.

Yet another advantage of an embodiment of the invention is that it addresses the lack of information about traveling ionospheric disturbances, due to the difficulty of measuring their propagation characteristics as a function of wave period. The horizontal velocity analysis requires spaced measurements, which are generally not available, and a method to separate the different wave components. Embodiments of the invention address both of those problems. In addition, there have been very few measurements of vertical phase trace velocity for TIDs, and the present invention addresses this problem by using different sounding frequencies to obtain measurements from different heights. Embodiments of the invention characterize the vertical and horizontal propagation characteristics of the entire wave spectrum, as a function of wave period from the acoustic wave spectrum near one minute periods, to the large scale gravity wave periods of an hour or more.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, one embodiment is directed towards a system for determining characteristics of traveling ionospheric disturbances (TIDs) and providing real time mapping of corresponding ionospheric perturbations. The system includes a first transmitter configured to emit a first signal at a first frequency, a second transmitter configured to emit a second signal at the first frequency shifted by a first shift amount and a third transmitter configured to emit a third signal at the first frequency shifted by a second shift amount. The system also includes a receiver configured to receive a reflected first signal from an ionosphere, reflected second signal from the ionosphere, and reflected third signal from the ionosphere. The reflected first signal, reflected second signal and reflected third signal include induced Doppler shifts caused by traveling ionospheric disturbances. The server in communication with the receiver is configured to process the first reflected signal, second reflected signal, and third reflected signal and generates the real time three dimensional mapping of corresponding ionospheric perturbations. Of course, in other embodiments, additional signals at different frequencies may be transmitted from the transmitter, in such cases, the vertical velocity of the TIDs may be computed as a function of wave period, as known in the art.

In another aspect of the present invention, another embodiment is directed towards a system for determining characteristics of traveling ionospheric disturbances (TIDs) and providing real time mapping of corresponding ionospheric perturbations. The system includes a first transmitter configured to emit a first signal at a first frequency. The system also includes a first receiver, second receiver and third receiver configured to receive the reflected signal from an ionosphere. The receivers are spaced apart in a non-colinear arrangement. The received reflected signal includes induced Doppler shifts caused by traveling ionospheric disturbances. The system also includes a server in communication with the first receiver, the second receiver and third receiver configured to process the reflected signal and generate the real time three dimensional mapping of corresponding ionospheric perturbations. Of course, in other embodiments, additional signals at different frequencies may be transmitted from the transmitter, in such cases, the vertical velocity of the TIDs may be computed as a function of wave period, as known in the art.

In another aspect of the present invention, yet another embodiment is directed towards a system for determining characteristics of traveling ionospheric disturbances (TIDs) and providing real time mapping of corresponding ionospheric perturbations. The system is directed towards a first receiver configured to receive a first signal and second signal transmitted through an ionosphere. The first signal and second signal yield total electron content fluctuations caused by traveling ionospheric disturbances. The system also includes a second receiver configured to receive a third signal and fourth signal transmitted through the ionosphere. The third signal and fourth signal yield total electron content fluctuations caused by traveling ionospheric disturbances. The system also includes a third receiver configured to receive a fifth signal and sixth signal transmitted through the ionosphere. The fifth signal and sixth yield total electron content fluctuations caused by traveling ionospheric disturbances. The system includes a server in communication with the first receiver, the second receiver and third receiver configured to process the first signal, the second signal, the third signal, the fourth signal, the fifth signal, and the sixth signal, the server is configured to obtain total electron content and to generate the real time mapping of total electron content fluctuations corresponding to propagating TIDs.

Still yet another embodiment is directed towards a method for determining real time three dimensional characteristics of traveling ionospheric disturbances (TIDs). The method includes the steps of performing normalization on each measured wave period, generating a two-dimensional wave structure for a first period of time, generating a total wave field for the first period of time, and storing total wave field for the first period of time. The method is also repeated by incrementing by a predetermined time and repeating the generating steps for an additional predetermined time steps. The method also includes merging the total wave field from the first period of time with those from the additional predetermined time steps and outputting graphically or storing for future reference.

This Summary section is neither intended to be, nor should be, construed as being representative of the full extent and scope of the present disclosure. Additional benefits, features and embodiments of the present disclosure are set forth in the attached figures and in the description herein below, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 9A illustrates a graphical representation of HF Doppler sounder data used in an example of the invention;

FIG. 9B illustrates a graphical representation of HF Doppler sounder data used in an example of the invention, for a different sounder operating frequency than that shown in FIG. 9A;

FIG. 9C illustrates a graphical representation of HF Doppler sounder data used in an example of the invention, for a different radio propagation mode than that shown in FIG. 9A;

FIG. 9D illustrates a graphical representation of HF Doppler sounder data used in example of the invention, for a different sounder frequency and radio propagation mode than that shown in FIG. 9A;

FIG. 10A illustrates a graphical representation of an output of module 514 of an example of the invention, a time series of the height change of the ionospheric reflection point;

FIG. 10B illustrates a graphical representation of an output of module 514 of an example of the invention, a time series of the height change of the ionospheric reflection point, for a different sounder operating frequency than that shown in FIG. 10A;

FIG. 10C illustrates a graphical representation of an output of module 514 of an example of the invention, a time series of the height change of the ionospheric reflection point, for a different radio propagation mode than that shown in FIG. 10A;

FIG. 10D illustrates a graphical representation of an output of module 514 of an example of the invention, a time series of the height change of the ionospheric reflection point, for a different sounder frequency and radio propagation mode than that shown in FIG. 10A;

FIG. 11A illustrates a graphical representation of an output of module 412 of an example of the invention, the speed of each wave as a function of wave period;

FIG. 11B illustrates a graphical representation of an output of module 412 of an example of the invention, the speed of each wave as a function of wave period, for a different operating frequency than that shown in FIG. 11A;

FIG. 11C illustrates a graphical representation of an output of module 412 of an example of the invention, the speed of each wave as a function of wave period, for a different propagation mode than that shown in FIG. 11A;

FIG. 11D illustrates a graphical representation of an output of module 412 of an example of the invention, the speed of each wave as a function of wave period, for a different frequency and propagation mode than that shown in FIG. 11A;

DETAILED DESCRIPTION OF THE ILLUSTRATED EMBODIMENTS

Figure 1:
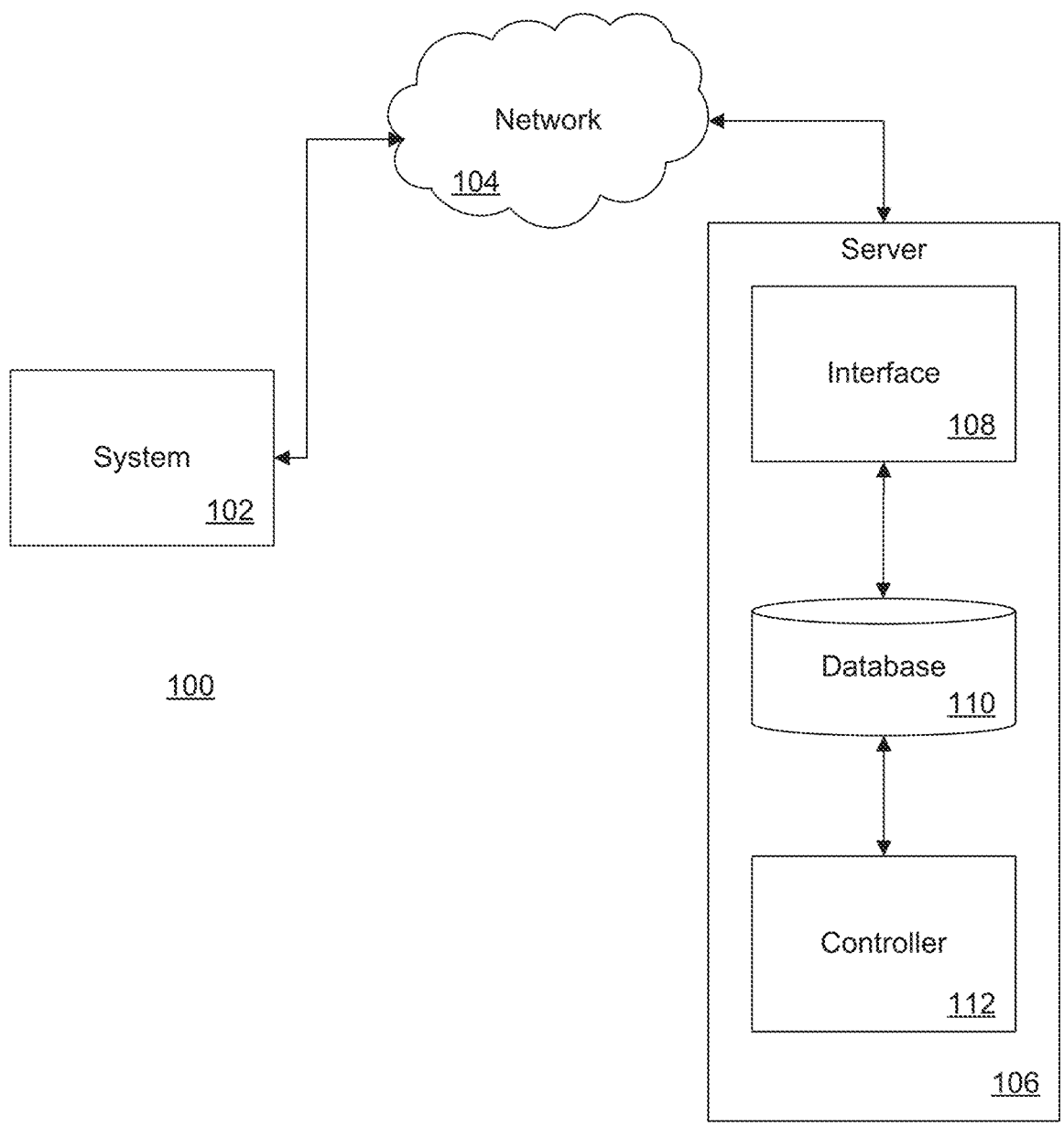
FIG. 1 illustrates an exemplary system for determining characteristics of traveling ionospheric disturbances according to an embodiment of the invention.

An embodiment of the invention is directed towards a system and method for determining characteristics of traveling ionospheric disturbances, and more particularly to a method and system for real time three dimensional mapping of ionospheric perturbations related to TIDs. The so-called traveling ionospheric disturbances have been detected for several decades. They are propagating perturbations in the ionospheric electron density that can be detected by a number of different instruments, including ionosondes, incoherent scatter radars, and HF Doppler sounder systems. Signatures of quasi-periodic structures detected by optical systems observing nighttime airglow emission have also been linked to the occurrence of TIDs. Even though the response of the ionosphere to AGWs is not trivial, TIDs have been commonly associated with the action of AGWs reaching the thermosphere. Hines (1959, 1960) provided the theoretical foundation explaining the occurrence of TIDs and their relationship with AGWs. Various authors have reviewed the extensive research material relating AGWs and TIDs (e.g. Yeh and Liu, 1974; Hines, 1974; Francis, 1975; Hunsucker, 1982; Hocke and Schegel, 1996).

Recently, Earle et al. (2008) presented experimental evidence associating AGWs with ion density fluctuations in the bottomside F-region. They analyzed in-situ measurements of density and velocity for both neutral and ion species collected during the late stage of the Dynamics Explorer 2 satellite, when the perigee of the spacecraft orbit was below 300 km. They found quasi-periodic fluctuations occurring simultaneously in the density and velocity measurements. The amplitude (30% for ions and 10% for neutrals), horizontal scale-sizes (100-200 km) and altitude (<300 km) where these fluctuations were observed are in good agreement with recent theoretical developments and predictions (Vadas and Fritts, 2005; Vadas, 2007). These observations also reinforce the idea of ionospheric disturbances (namely TIDs) caused by AGWs.

Relatively new observations have also suggested the occurrence of a new class of middle and low-latitude TIDs that is worthy of mentioning. These "non-classical" TIDs usually occur at night, are accompanied by large electric fields, and tend to move in the southwest direction and can cause large total electron content (TEC) fluctuations (e.g. Miller et al., 1997; Saito et al., 2001). The development of these "electrodynamic" TIDs is commonly attributed to the Perkins instability and associated with mid-latitude spread F (e.g. Miller et al., 1997; Kelley and Fukao, 1991; Kelley and Miller, 1997). Because of the low-growth rate of the Perkins instability (Perkins, 1973), it has been suggested that AGWs might also play a role in the somewhat fast development of these TIDs.

Based on their phase velocity and wave period, AGWs and classical TIDs are often classified as either medium or large-scale waves. Some coarse guidelines on the properties of these two groups are summarized in Table 1.

TABLE 1

Typical Properties of Medium and Large-Scale AGWs/TIDs

|  | Period | $V_H$ (m/s) | $\lambda$ |
|---|---|---|---|
| Medium scale | 10-30 min | 50-300 | 100-300 |
| Large scale | 0.5-5 h | 300-1000 | 300-3000 |

Embodiments of this invention illustrate medium and large-scale TID observations made by a HF Doppler sounder configured to provide continuous monitoring of the TID activity and estimation of TID propagation parameters. However, we have shown that the acoustic part of the wave spectrum is also accessible by this technique. In one embodiment, TIDs caused by gravity waves (shortest periods of about 10 minutes) are examined; however, other TIDs caused by acoustic waves, with periods shorter than about 10 minutes can also be examined.

One embodiment is directed towards a system for determining characteristics of traveling ionospheric disturbances (TIDs) and providing real time mapping of corresponding ionospheric perturbations. The system includes a first transmitter configured to emit a first signal at a first frequency, a second transmitter configured to emit a second signal at the first frequency shifted by a first shift amount and a third transmitter configured to emit a third signal at the first frequency shifted by a second shift amount. The system also includes a receiver configured to receive a reflected first signal from an ionosphere, reflected second signal from the ionosphere, and reflected third signal from the ionosphere. The reflected first signal, reflected second signal and reflected third signal include induced Doppler shifts caused by traveling ionospheric disturbances. The server in communication with the receiver is configured to process the first reflected signal, second reflected signal, and third reflected signal and generates the real time three dimensional mapping of corresponding ionospheric perturbations.

In embodiments of the invention, the first frequency is in a range from about 2 MHz to about 15 MHz. Also, the first frequency shift amount is in a range from about 3 Hz to about 150 Hz. The frequency shift amount is based on the configuration of the receiver, therefore, it may be greater or less. Moreover, the second frequency shift amount is greater than the first shift amount. In one embodiment, the server is in wireless communication with the receiver, however, it also may be hardwired or a combination of the same. In addition, the server may be at the same location as the receiver.

In one embodiment, the first signal, the second signal and the third signal can include a continuous wave and/or a chirp signal. A chirp is a signal in which the frequency increases ('up-chirp') or decreases ('down-chirp') with time. In some sources, the term chirp is used interchangeably with sweep signal.

Another embodiment is directed towards a system for determining characteristics of traveling ionospheric disturbances (TIDs) and providing real time mapping of corresponding ionospheric perturbations. The system includes a first transmitter configured to emit a first signal at a first frequency. The system also includes a first receiver, second receiver and third receiver configured to receive the reflected signal from an ionosphere. The receivers are spaced apart in a non-colinear arrangement. The reflected signal includes an induced Doppler shifts caused by traveling ionospheric disturbances. The system also includes a server in communication with the first receiver, the second receiver and third receiver configured to process the reflected signal and generate the real time three dimensional mapping of corresponding ionospheric perturbations.

Yet another embodiment is directed towards a system for determining characteristics of traveling ionospheric disturbances (TIDs) and providing real time mapping of corresponding ionospheric perturbations. The system is directed towards a first receiver configured to receive a first signal and second signal transmitted through an ionosphere. The first signal and second signal yield total electron content fluctuations caused by traveling ionospheric disturbances. The system also includes a second receiver configured to receive a third signal and fourth signal transmitted through the ionosphere. The third signal and fourth signal yield total electron content fluctuations caused by traveling ionospheric disturbances. The system also includes a third receiver configured to receive a fifth signal and sixth signal transmitted through the ionosphere. The fifth signal and sixth yield total electron content fluctuations caused by traveling ionospheric disturbances. The system includes a server in communication with the first receiver, the second receiver and third receiver configured to process the first signal, the second signal, the third signal, the fourth signal, the fifth signal, and the sixth signal, the server is configured to obtain total electron content and to generate the real time mapping of total electron content fluctuations corresponding to propagating TIDs.

Still yet another embodiment is directed towards a method for determining real time three dimensional characteristics of traveling ionospheric disturbances (TIDs). The method includes the steps of performing normalization on each measured wave period, generating a two-dimensional wave structure for a first period of time, generating a total wave field for the first period of time, and storing total wave field for the first period of time. The method is also repeated by incrementing by a predetermined time and repeat generating steps for a second period of time. The method also includes merging the total wave field from the first period of time with the second period of time and outputting graphically or storing for future reference.

In embodiments of the invention, functional units described herein may be labeled as programs or modules, in order to more particularly emphasize their structural features. A module, program or block of a flow ("block") chart may be implemented as hardware, e.g., comprising circuits, gate arrays, off-the-shelf semiconductors such as logic chips, transistors, or other discrete components. They may be fabricated with Very-large-scale integration (VLSI) techniques. A module, program or block may also be implemented in programmable hardware such as field programmable gate arrays, programmable array logic, programmable logic devices or the like. Modules, programs or blocks may also be implemented in software for execution by various types of processors.

An identified module or block of programmable or executable code may, for instance, include one or more physical or logical blocks of computer instructions which may, for instance, be organized as an object, procedure, or function. Components of a module or block need not necessarily be physically located together but may include disparate instructions stored in different locations which, when joined logically together, include the module and achieve the stated function for the module. A module, block, and/or a program of executable code may be a single instruction, or many instructions, and may even be distributed over several different code segments, among different programs, and across several memory devices or other devices. Similarly, data or input for the execution of such modules or blocks may be identified and illustrated herein as being an encoding of the modules, or being within modules, and may be embodied in any suitable form and organized within any suitable type of data structure.

In embodiments of the invention, the system, blocks, components and/or modules discussed herein may include one or more of the following: a server or other computing systems including a processor for processing digital data, a memory coupled to the processor for storing digital data, an input digitizer coupled to the processor for inputting digital data, an application program stored in one or more machine data memories and accessible by the processor for directing processing of digital data by the processor, a display device coupled to the processor and memory for displaying information derived from digital data processed by the processor, and a plurality of databases or data management systems.

In addition, embodiments may be in terms of functional block components, screen shots, user interaction descriptions, optional selections, various processing steps, and the like. It should be appreciated that such descriptions may be realized by any number of hardware and/or software components configured to perform the functions described. Accordingly, to implement such descriptions, various integrated circuit components, e.g., memory elements, processing elements, logic elements, look-up tables, input-output devices, displays and the like may be used, which may carry out a variety of functions under the control of one or more microprocessors or other control devices.

In embodiments of the invention, software elements or programs may be implemented with any programming, scripting language, and/or software development environment, e.g., Fortran, C, C++, C#, COBOL, Cloud based programing languages, Web Logic, Web Sphere, assembler, PERL, Visual Basic, SQL Stored Procedures, AJAX, extensible markup language (XML), Flex, Flash, Java, .Net and the like. Moreover, the various algorithms in the embodiments may be implemented with any combination of data structures, objects, processes, routines or other programming elements.

In embodiments of the invention, any number of conventional techniques for data transmission, signaling, data processing, network control, and the like may be used, as one skilled in the art will understand. Further, detection or prevention of security issues using various techniques known in the art, e.g., encryption, may be also be used in embodiments of the invention. Additionally, many of the functional units and/or modules herein may be described as being "in communication" with other functional units and/or modules. Being "in communication" refers to any manner and/or way in which functional units and/or modules, such as, but not limited to, computers, laptop computers, PDAs, mobile devices, smart phones, modules, and other types of hardware and/or software may be in communication with each other. Some non-limiting examples include communicating, sending and/or receiving data and metadata via a network, a wireless network, software, instructions, circuitry, phone lines, Internet lines, fiber optic lines, RF signals, satellite signals, electric signals, electrical and magnetic fields and/or pulses, combinations of the same, and/or the like.

By way of example, communication among the users and/or servers in accordance with embodiments of the invention may be accomplished through any suitable communication channels, such as, for example, a telephone network, an extranet, an intranet, the Internet, cloud based communication, point of interaction devices (point of sale device, personal digital assistant, cellular phone, kiosk, and the like), online communications, off-line communications, wireless communications, RF communication, transponder communications, local area network (LAN), wide area network (WAN), cell communication, mesh network communication, satellite communication, networked or linked devices, combinations of the same and the like. Moreover, although embodiments of the invention may be implemented with using IEEE protocols or any number of existing or future protocols the specific information related to the protocols, standards, and application software utilized in connection with the Internet is generally known to those skilled in the art and, as such, need not be detailed herein.

Reference will now be made in detail to an embodiment of the present invention, example of which is illustrated in the accompanying drawings.

FIG. 1 illustrates an exemplary system for determining characteristics of traveling ionospheric disturbances according to an embodiment of the invention. Referring to FIG. 1, the system 100 includes, for example, a unit or system 102 configured to measure quasi-periodic variations in some signal characteristic caused by some variation of the ionosphere. The system is also configured to provide mapping of corresponding ionospheric perturbations, e.g., in the case where height changes are measured this yields a three dimensional mapping of the ionospheric perturbations, and in the case where TECs are measured this yields a map of TEC perturbations.

For example, the system 102 may include a high frequency (HF) system with or without frequency modulation configured to detect transient changes in the ionosphere, a Global Navigation Satellite System (GNSS) configured to measure ionospheric total electron content (TEC) variations, a HF Doppler sounder system for monitoring wave activity in the F region ionosphere, a visible or non-visible light detection system configured to respond to changes in electron density, combinations of the same and other systems as known in the art for measuring quasi-periodic shifts in some signal characteristic caused by some variation of the ionosphere.

In a preferred embodiment, the system 102 is configured to obtain time series of quasi-periodic variations from at least three measurement locations that are non-co-linear, and whose separation dictates the types of waves that can be reliably measured. The system 102 is in communication over a communication network 104 to a server 106. The server 106 includes an interface 108, a database 110 and a controller 112 in communication with each other. The server 106 communicates with the database 110, which may include one or more databases, for storing information received from the system and outputs of modules described herein. The database 110 may also reside partially or fully in the network 104, e.g., a cloud database. The server 106 handles the programs or modules running and implemented as described herein. The server 106 may include one or more servers. The controller 112 is configured to control the server 106 as known in the art.

Figure 2:
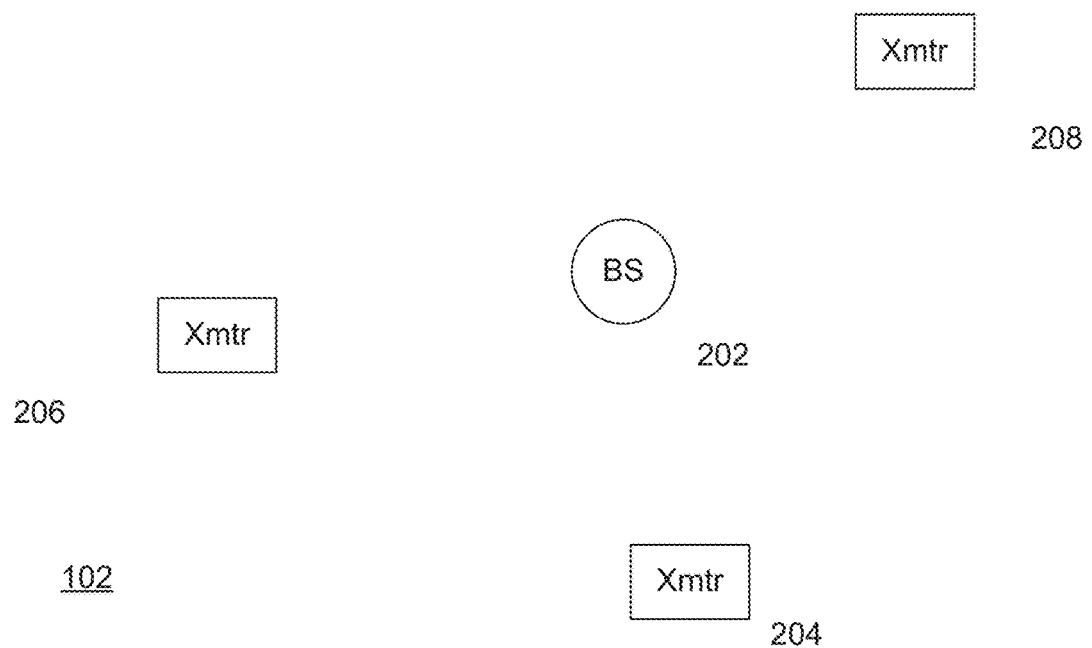
FIG. 2 illustrates an exemplary HF Doppler sounder system for determining characteristics of traveling ionospheric disturbances according to an embodiment of the invention.

FIG. 2 illustrates an exemplary HF Doppler sounder system for determining characteristics of traveling ionospheric disturbances according to an embodiment of the invention.

Referring to FIG. 2, the system 102 in this embodiment is a HF Doppler sounder system for monitoring wave activity in the F region ionosphere. The system 102 includes a first HF continuous wave (CW) transmitter 204, a second HF continuous wave (CW) transmitter 206, and a third HF continuous wave (CW) transmitter 208 that are arranged in a non-colinear relationship. Optionally, the number of transmitters may be increased, e.g., four or more transmitters, in addition there may be duplicate transmitters transmitting different radio frequencies at the same location. The HF CW transmitters are configured to broadcast a fixed-frequency CW signal in a range from about 2 MHz to about 10 MHz or greater, with an output power in a range from about 1 Watt to about 1000 Watts or greater. In a preferred embodiment, 100 W output power is sufficient to allow the Doppler signal to be distinguished from interfering signals. As the number of transmitters is increased the redundancy and accuracy of the system is also increased.

The system 102 includes a base station 202 having four receivers (not shown), receiving antenna sets (not shown), optionally transmitters for transmitter data to the network, and a digital data acquisition system (not shown). The number of receivers at the base station 202 can also be increased or decreased according to the number of independent frequencies being broadcast by each transmitter location. For example, with two operating frequencies, four receivers are typically used to capture multiple polarizations of both frequencies. The base station 202 also includes a server configured to execute programs or modules as described herein. In one embodiment, the base station 202 includes a server as described with reference to server 106. Of course other processors may be utilized.

In a preferred embodiment, the transmitters 204, 206 and 208 are located at sites symmetrically (if possible) distributed around the base station 202. Also, preferably the transmitters 204, 206 and 208 are each equipped with two transmitters that transmit radio waves at different frequencies, which are configured to probe different ionospheric heights. The remote stations are deployed at approximately equal distances in range from about 20 km to about 1000 km, depending on the wavelength of the waves of interest, but preferably the transmitters are located at a range from about 50 to about 100 km from the base station 202. The transmitters 204, 206, and 208 have a nominal output power, e.g., of about 100 W or greater and are configured to operate continuously and unattended for several weeks or months. The operation frequency can be specified by the user and can vary in range from about 2 MHz to about 10 MHz or greater. The operation frequencies are chosen according to geophysical conditions and FCC frequency allocation regulations among other factors as known in the art.

In a preferred embodiment, the system 102 is configured to operate at two central frequencies and in this configuration requires two transmitters at each transmitter site. During the right propagation conditions, the transmitted signals are reflected by the ionosphere and are received at the base station 202. The remote stations 204, 206 and 208 transmit and the base station 202 receives all the signals, continuously and simultaneously. To differentiate between the incoming signals from each station, the actual transmitted frequency is shifted, e.g., by 0 Hz, 10 Hz or 20 Hz from the nominal frequency in each station. Other shifts in frequency may also be used and configured to allow for differentiation of the signals.

Figure 3:
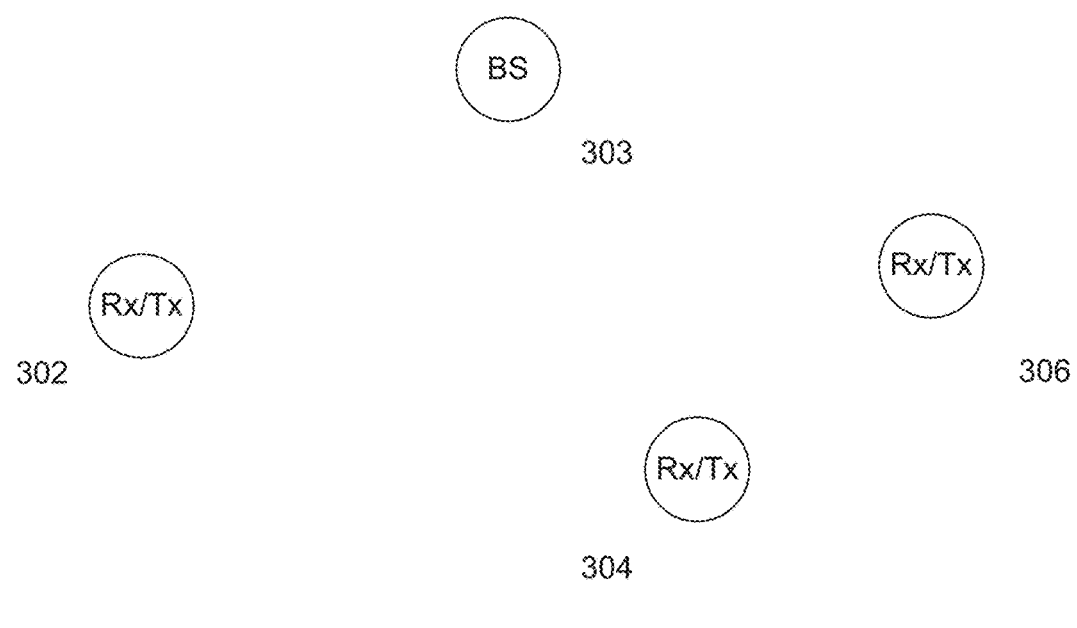
FIG. 3 illustrates an exemplary GPS TEC system for determining characteristics of traveling ionospheric disturbances according to an embodiment of the invention.

FIG. 3 illustrates an exemplary Global Navigation Satellite System (GNSS) total electron content (TEC) system 102 for determining characteristics of traveling ionospheric disturbances according to an embodiment of the invention. Referring to FIG. 3, the system 102 is configured to measure ionospheric TEC variations with three or more receivers that are arranged in a non-colinear orientation. In this embodiment, there are at least three receivers, 302, 304 and 306; the receivers 302, 304 and 306 are configured to receive radio signals from the GNSS. The radio signals are sent from one or more satellites as known in the art. However, the number of receivers may be increased to give more independent measurement to be used herein. In a preferred embodiment, the receivers are deployed at approximately equal distances in a range from about 20 km to about 1000 km, depending on the wavelength of the waves of interest, but preferably the receivers are separated by distances in the range from about 50 km to about 100 km apart. The receivers optionally include transmitters or a network connection to permit communication to a central location, e.g., base station 303.

Figure 4:
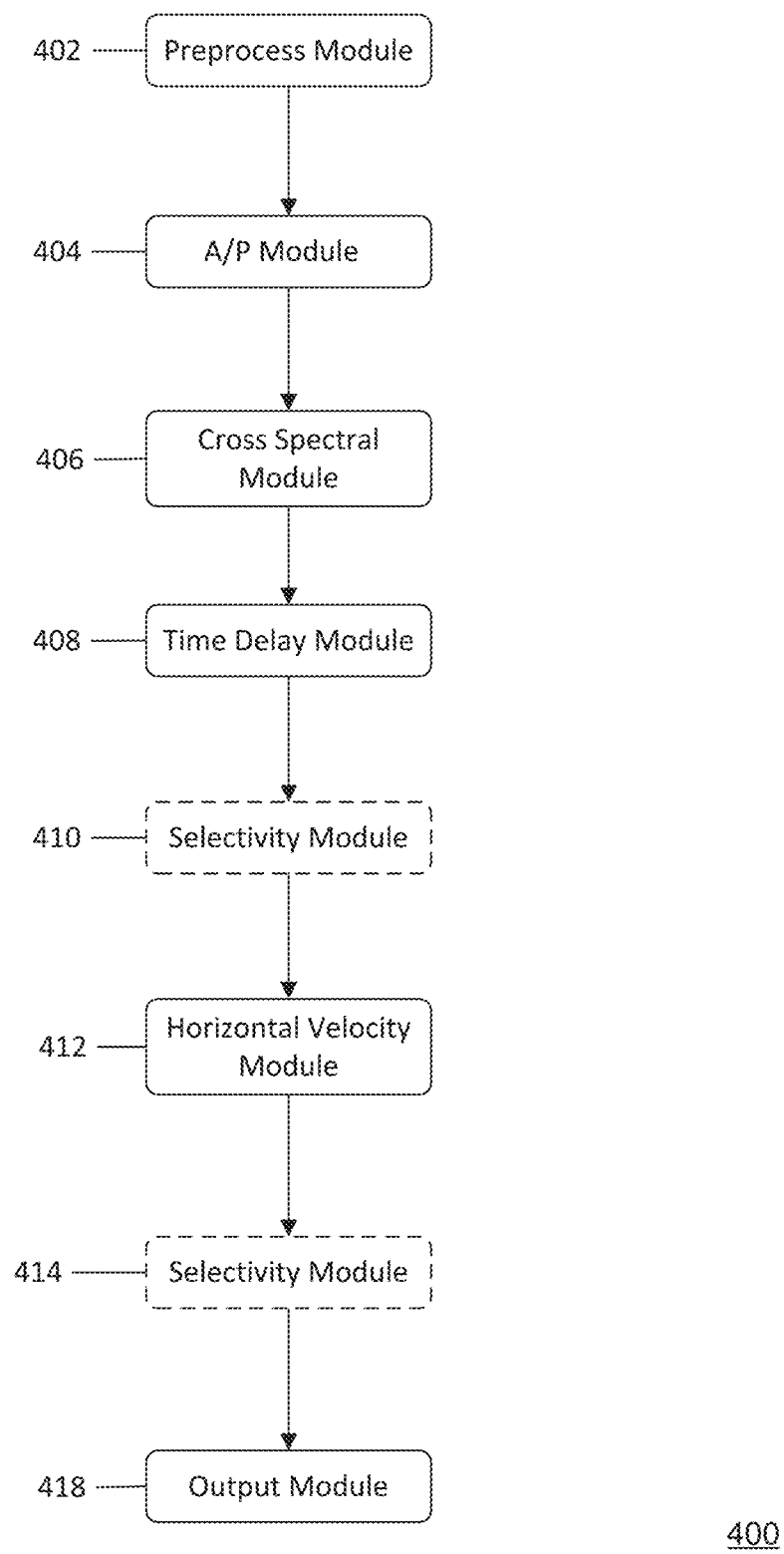
FIG. 4 illustrates an exemplary flowchart depicting processes performed by exemplary modules according to an embodiment of the invention.

FIG. 4 illustrates an exemplary flowchart depicting processes performed by exemplary modules according to an embodiment of the invention.

Referring to FIG. 4, the flowchart 400 illustrates an exemplary process for real time three dimensional measurements and/or mapping of corresponding ionospheric perturbations. The mapping may include a real time graphical output or stored data representing the same. The process may be implemented as a module and/or program code at a base station or other location, e.g., server location, or combinations of the same. The process 400 includes a preprocess module 402 for preprocessing received radio signals into estimates of change of some parameter (such as reflection height) as a function of time for each transmitter and radio frequency. The received signals represent a quasi-periodic change in some signal characteristic caused by some variation of the ionosphere, e.g., Doppler shift or change in trans-ionospheric total electron content. A preferred embodiment of the preprocess module is described in greater detail with reference to FIGS. 5A and 5B.

Figure 5A:
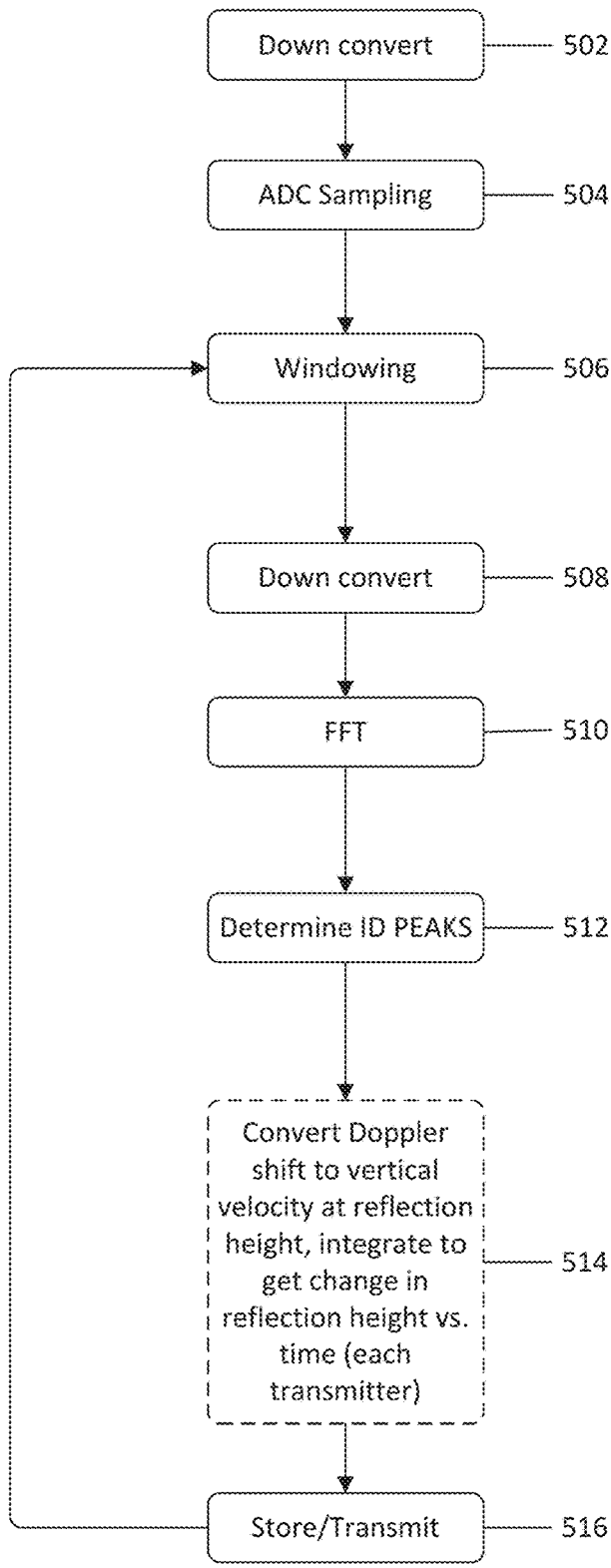
FIG. 5A illustrates an exemplary flowchart depicting processes performed by an exemplary preprocess module according to an embodiment of the invention

FIG. 5A illustrates an exemplary flowchart depicting processes performed by an exemplary preprocess program 402 for a system described with reference to FIG. 2. Referring to FIG. 5A, in module 502 data received at each receiver of the HF Doppler sounder system is down converted from broadcasting frequency to preferred processing frequency, e.g., kHz range. Next, an analog to digital converter 504 samples at a frequency, e.g., 19.2 kHz. In Module 506, windowing is performed to collect a predetermined time of sampling, e.g., in a range from about a 2 second window to about a 30 second window or greater. As the data collection window is increased better frequency resolution occurs. Next, in module 508 a down conversion to baseband decimates the sampling from 19.2 kHz to 150 Hz, and a Fast Fourier Transform (FFT) is performed (module 510).

In module 512, the data from module 510 is parsed to locate the signals from the three transmitters in the data from each of the receivers. These signals will be located at approximately the frequency shifts imposed for signal recognition purposes, 0 Hz, 10 Hz, and 20 Hz, respectively. The frequency and amplitude of these signals is identified and recorded by the database. Module 514 is optional at this point and described with reference to FIG. 8. Should FIG. 8 be performed, this module will need to be performed. In module 516 the data is stored, e.g., in database or memory, and/or transmitted to the next corresponding module. Once the data from this window has been stored, the process repeats on another 2 to 30 second window of ADC samples using module 506.

Figure 5B:
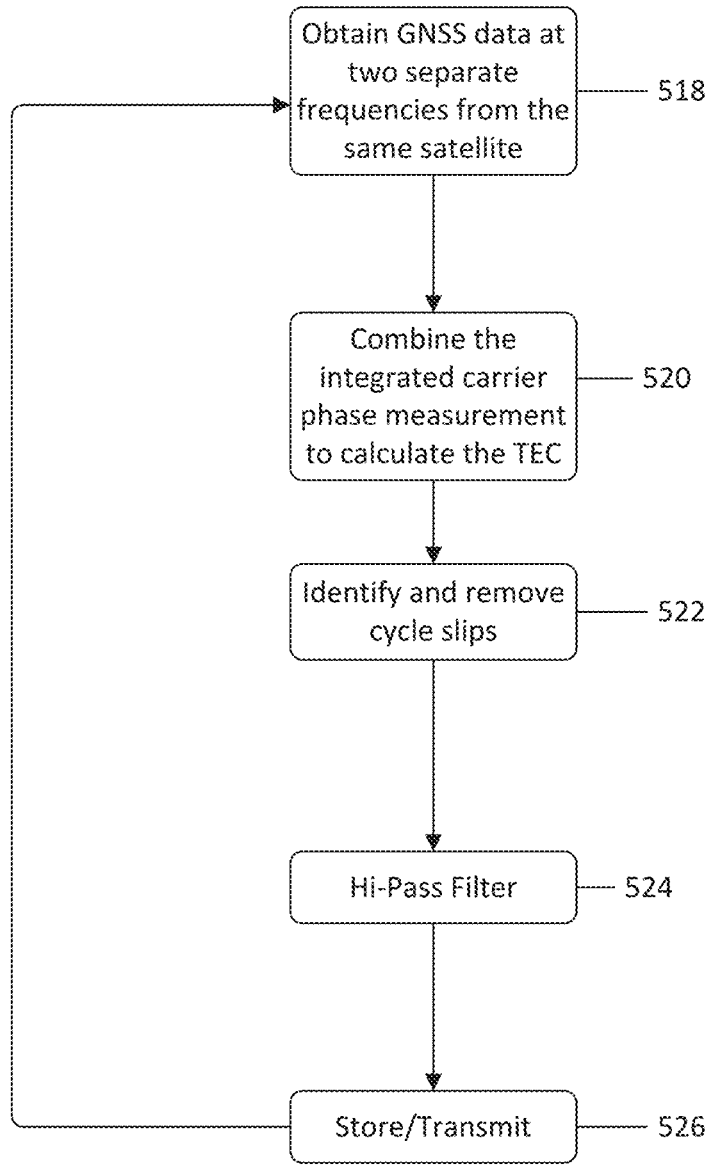
FIG. 5B illustrates an exemplary flowchart depicting processes performed by an exemplary preprocess module, according to an embodiment of the invention.

FIG. 5B illustrates an exemplary flowchart depicting processes performed by an exemplary preprocess module for a system of FIG. 3. Referring to FIG. 5B, in module 518 data is received at each receiver of the GNSS system which includes an integrated carrier phase of two GNSS signals at two separate frequencies from the same satellite. In module 520, the two integrated carrier phase measurements from module 518 are combined to calculate the total electron content, in a manner known to one of skill in the art. In module 522, identification and removal of cycle slips is performed. This is done by taking the time derivative of the total electron content, and checking for times when the derivative exceeds a pre-determined threshold of about 10 TECU/minute or higher. Lower thresholds will be more aggressive, and could potentially falsely identify rapid ionospheric variations as cycle slips, while higher thresholds might let small cycle slips through to the rest of the analysis. The faster the sampling rate of the data, the higher the threshold that can be used without potentially missing cycle slips, reducing the likelihood of falsely identifying real ionospheric variations as cycle slips. Once a cycle slip has been identified, it may be removed using one of many techniques, such as polynomial fitting or other techniques known in the art. In module 524, a high pass filter is utilized on the data of module 522, e.g., the cut-off frequency of the filter is in a range from about 5 minutes to about 120 minutes. The filter depends on the periods of the waves of interest as described herein. For example, for gravity waves with a period under 60 minutes, a cutoff frequency of 60 to 90 minutes would typically be used. The goal of the high pass filter is to remove the low frequency variation caused by the satellite motion and the change in the radio path length through the ionosphere over the course of the satellite pass. In module 526 the data is stored, e.g., in database or memory, and/or transmitted to the next corresponding module. Once the data has been stored, the process repeats on another time range or using the data from another satellite using module 518.

Next, the Amplitude and Phase (A/P) module 404 is described, in this module 404 the input includes a time series of quasi-periodic shifts from at least three measurement locations; their separation distance and non-co-linear positions dictate the types of waves that will be optimally detected by the array. Optionally, as the number of inputs increases, e.g., the greater number of measurement locations or receivers, the redundancy, quality control and/or opportunity to validate the measurement, accuracy and precision increases.

In this module 404, a predetermined time windowing of each signal, that is selected based on the acoustic or gravity wave periods of interest, is applied, and should include between two and ten times the wave period of interest, e.g., a 20 minute wave period would suggest that a data window length in a range from about 40 minutes to about 200 minutes or greater could be used. Other data window lengths could also be used. A fast Fourier transform (FFT) is computed on each window of signal data to obtain an amplitude and phase as a function of wave period for each of the three or more transmission paths. Alternatively or optionally, other methods of deducing amplitudes and phases may be used, e.g., wavelet analysis, maximum entropy and other methods as may be known in the art. This would be the output of module 404.

Next, a cross-spectral module 406 utilizes the output of A/P module 404 to determine i) the phase delay between different pairs of transmission paths as a function of wave period, and ii) the corresponding cross-coherency calculated for different pairs of transmission paths as a function of wave period. The phase delays are needed for the horizontal phase trace velocity calculation to be described below. This is described in greater detail with reference to Crowley, G., Doppler radar studies of the Antarctic ionosphere, PhD. Thesis, 1985, which is hereby incorporated by reference as if fully set forth herein. A preferred embodiment of the preprocess module is described in greater detail with reference to FIG. 6.

Figure 6:
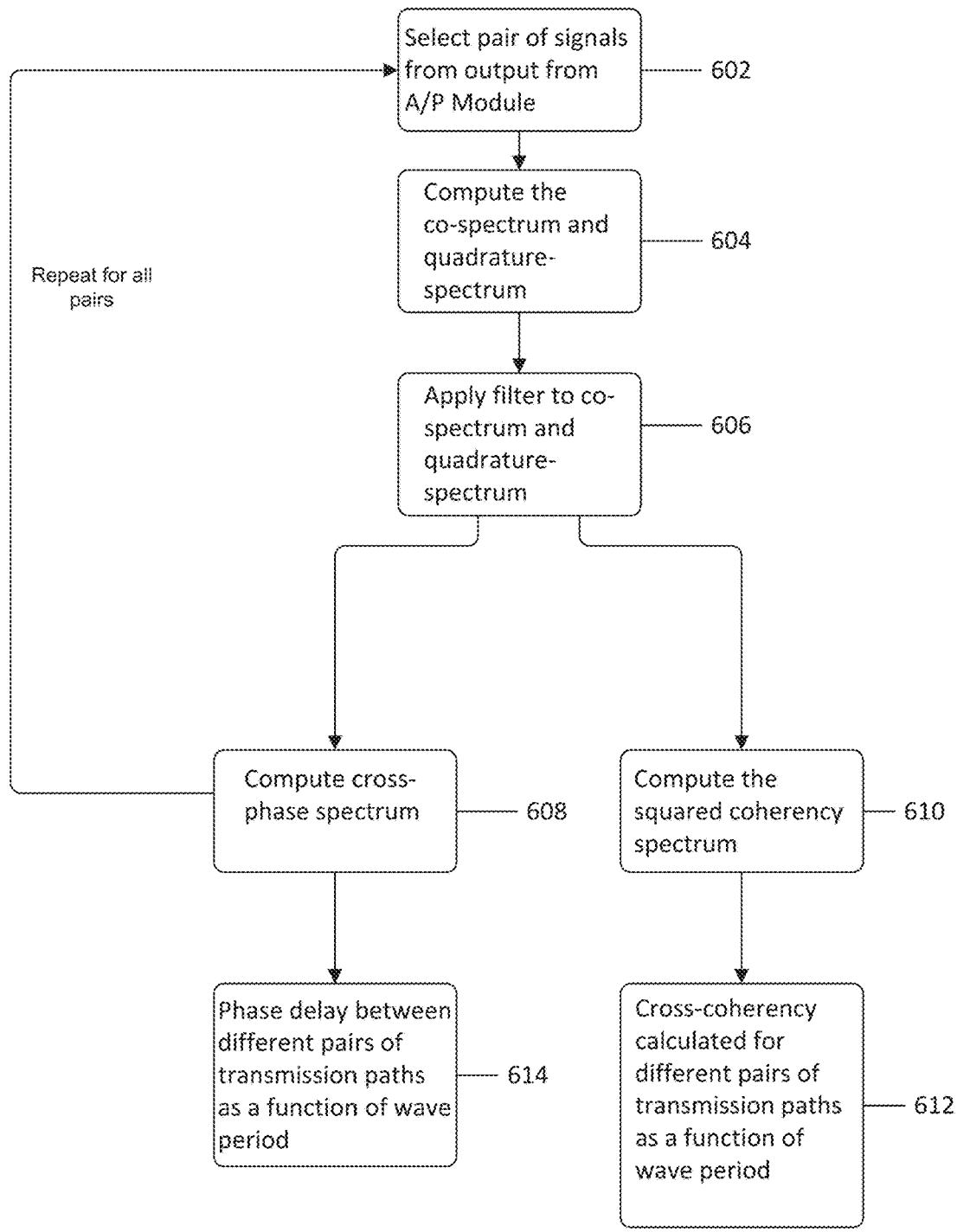
FIG. 6 illustrates an exemplary flowchart depicting processes performed by an exemplary cross spectral module according to an embodiment of the invention.

FIG. 6 illustrates an exemplary flowchart depicting processes performed by an exemplary cross spectral module 406 according to an embodiment of the invention. Referring to FIG. 6, the inputs to the cross spectral module 406 are the amplitude and phase spectra from each radio transmission path from the previous A/P module 404. Optionally, in the case where GPS TEC receivers are utilized via the system of FIG. 3, rather than a HF CW sounder of FIG. 2, the spectra are obtained for the TEC measurement from each GPS receiver. In module 602, the spectra are selected in pairs, cycling through each permutation, for example, three HF Doppler transmission paths would yield three unique pairs.

The cross spectrum of two signals $x_1(t)$ and $x_2(t)$ is defined with the following equation:

$$S_{12}(f) = X_1^*(f) \cdot X_2(f)$$

where $X_1(f)$ and $X_2(f)$ are Fourier transforms of time series $x_1(t)$ and $x_2(t)$, and the '*' denotes the complex conjugate. The units of x(t) and X(f) depend on what changing ionospheric parameter is being measured as known in the art. In the case where $x_1(t)$ and $x_2(t)$ are Doppler shifts with units of [Hz], then the units of $X_1(f)$ and $X_2(f)$ are also [Hz], and the units of $S_{12}(f)$ are [Hz$^2$]. $S_{12}(f)$ is a complex quantity whose real and imaginary parts are called the co-spectrum ($L_{12}(f)$ [Hz$^2$] and quadrature spectrum ($Q_{12}(f)$) [Hz$^2$], written with the following equation:

$$S_{12}(f) = L_{12}(f) - iQ_{12}(f)$$

which may also be expressed as the product of amplitude and phase functions called the cross-amplitude and phase-spectra.

$$S_{12}(f) = A_{12}(f) \cdot e^{F_{12}(f)}$$

where $A_{12}^2(f) = L_{12}^2(f) + Q_{12}^2(f)$ and $F_{12}(f) = \arctan[-Q_{12}(f)/L_{12}(f)]$ The cross-amplitude spectrum indicates whether frequency components in one time series are associated with large or small amplitudes at the same frequency in the other time series. The phase spectrum, $F_{12}(f)$ [units of degrees or radians], indicates the phase relationship between the frequency components of the two time series. The phase differences may be converted into time delays and employed in conjunction with the experimental geometry to estimate the velocities of disturbances.

The squared coherency spectrum (referred to simply as coherency) is employed in preference to the cross amplitude spectrum and is defined with the equation as follows:

$$K_{12}^2(f) = \frac{L_{12}^2(f) + Q_{12}^2(f)}{|X_1(f)|^2 \cdot |X_2(f)|^2}$$

This provides a measure of the noise in the two spectra at a given frequency, in that when the noise is zero the coherency is unity. Similarly, when the two signals are uncorrelated at a given frequency, their coherency $K_{12}^2$ is zero. Most importantly, the coherency indicates the confidence that can be placed on estimates of the phase spectrum and corresponding velocity estimates. We note that cross-spectral estimates have the same undesirable properties as auto spectra with regard to leakage and variance, therefore smoothing is necessary as the squared coherency is uniformly unity unless smoothing is applied. In practice, a simple replacement of the sample cospectrum and quadrature spectrum by their smoothed counterparts produces the most accurate cross-spectral results. Thus the cross-phase spectrum, module 608, and squared coherency spectrum, module 610, become as shown with the following equations:

$$\overline{F}_{12}(f) = \arctan[-\overline{Q}_{12}(f)/\overline{L}_{12}(f)]$$

$$\overline{K}_{12}^2(f) = \frac{(\overline{L}_{12}(f))^2 + (\overline{Q}_{12}(f))^2}{|X_1(f)|^2 \cdot |X_2(f)|^2}$$

In addition, module 606 indicates that a Hanning filter or other filter as known in the art is used for the smoothing. Therefore, upon completion the Phase delay between different pairs of transmission paths as a function of wave period is calculated [module 614] and cross-coherency is calculated for different pairs of transmission paths as a function of wave period, module 612.

In the time delay module 408, the phase delays between different pairs of transmission paths as a function of wave period are used as an input. Each phase delay is multiplied by the corresponding wave period to convert from phase domain to time domain to determine a time delay between different pairs of transmission paths as a function of wave period.

A selectivity module 410 is optional and configured to optimize the output of the process. In one embodiment, it is used to determine which wave periods are mostly likely to represent a real wave in the ionosphere. The inputs are the cross-coherencies calculated for different pairs of transmission paths as a function of wave period. It is determined which of the cross-coherency measurements exceed a predetermined threshold in order to select the optimum data for further analysis. A preferred embodiment of the preprocess module is described in greater detail with reference to FIG. 7.

Figure 7:
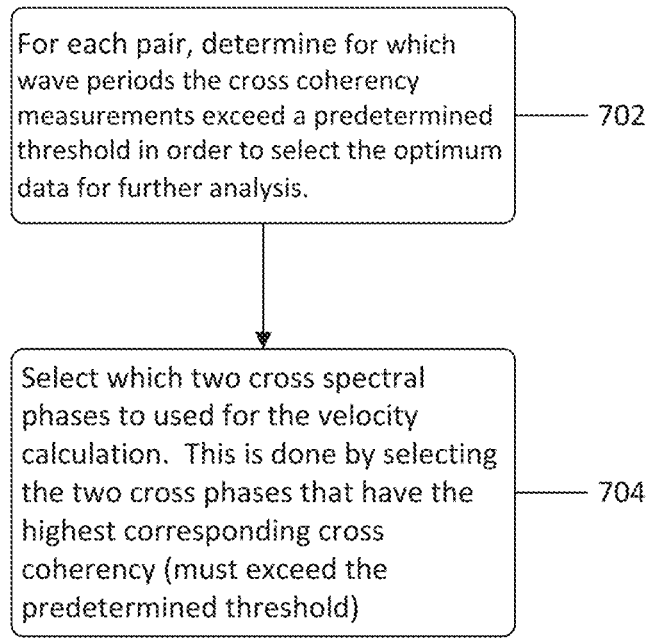
FIG. 7 illustrates an exemplary flowchart depicting processes performed by an exemplary selectivity module according to an embodiment of the invention.

Referring to FIG. 7, the selectivity module 410 is further explained. In module 702, for each pair, determine for which wave periods the cross coherency measurements exceed a predetermined threshold (range, 0.3-0.8 or greater, preferred 0.55 (95% confidence it is a real signal)) in order to select the optimum data for further analysis. For wave periods where less than two pairs exceed the threshold, no wave parameters would typically be computed for that wave period due to excessive uncertainties. Next in module 704, select which two cross spectral phases to use for the velocity calculation, by selecting the two cross phases that have the highest corresponding cross coherency (exceeding the predetermined threshold).

A horizontal velocity module 412 is used to determine a horizontal speed and azimuth versus wave period for selected waves using the equation below. The inputs into the module 412 are two selected time delays between different pairs of transmission paths as a function of wave period. Optionally, an additional input in the module 412 includes a selected cross-coherency calculated for different pairs of transmission paths as a function of wave period. The selected cross-coherency is used to calculate error bars on speed and azimuth for each wave period.

The horizontal speed and azimuth versus period for selected waves are calculated using the equations below. Also, points A, B, and C are the three measurement locations in the system (FIG. 2, items 204, 206, and 208). More specifically, in one embodiment, the locations depend on wave period and coherency for each pair of permutation of the signals, i.e., which location corresponds to A, B, or C in the below equations will depend on the output of module 410. The equations are written such that the two cross spectral phases used in the velocity calculation are those between points A and C, and between points B and C. The equations are as follows:

xac=east/west distance between reflection points A and C, xac has units of km, positive if A is eastward of C.

yac=north/south distance between reflection points A and C, yac has units of km, positive if A is northward of C.

xbc=east/west distance between reflection points B and C, xbc has units of km, positive if B is eastward of C.

ybc=north/south distance between reflection points B and C, ybc has units of km, positive if B is northward of C.

tac=time difference between reflection points A and C, tac has units of seconds.

tbc=time difference between reflection points B and C, tbc has units of seconds.

ax=(yac*tbc−ybc*tac)/(yac*xbc−ybc*xac), ax has units of sec/km.

ay=(xbc*tac−xac*tbc)/(yac*xbc−ybc*xac), ay has units of sec/km.

aa=sqrt(ax*ax+ay*ay), aa has units of sec/km.

v=(1./aa)*1000, v has units of m/s.

az=a tan(ax/ay), az has units of angle from North, with positive values to the East of North; degrees or radians depending on the particular implementation of the a tan function.

A second selectivity module 414 may be optionally used to improve confidence in the velocity estimates obtained from module 412. In this optional module 414, independent measurements are collected and analyzed with predetermined criteria. In a preferred embodiment, the horizontal speed for each wave period is compared to the horizontal speed for the same wave period in another independent measurement, e.g., a different sounder frequency or different polarization for the same frequency to determine the speed difference. If the speed difference is less than some predetermined criterion, e.g., a factor of two or less, then the wave passes the validity test and can be used for further processing. In addition or alternatively, azimuth vectors from independent measurements for each wave period are compared to obtain an azimuth difference; the difference is compared against some predetermined criterion, e.g., azimuth difference less than 60 degrees, to establish the validity of the two azimuth measurements. If the azimuth vectors for each wave pass the criteria then they can be passed along to the next module.

The output module 418 is used to output the graphical mapping of traveling ionospheric disturbances (TIDs) or storing the data into any desired format, graphical display, stored data, database data, and combinations of the same or the like. In one embodiment, the output from the velocity module includes a data structure containing all of the information required to analyze the ionospheric wave structure at the time and typically includes wave speed, speed error, azimuth, azimuth error, period, and wavelength, and amplitude. The module 418 is configured to combine wave periods, azimuths, speeds, amplitudes, and relative phases of each selected wave to generate a three dimensional map of the height perturbations experienced by an isoionic contour. This can be performed repeatedly, optionally, in real time, if desired, to produce a graphical output or stored data for future reference, e.g., animation of the ionospheric iso-ionic contour motion.

A corrective module (not shown) is used with the system of FIG. 3. It is thought that the corrective module could be used to adjust the results of the analysis to account for the movement of the measurement location over the course of the satellite pass. This moving measurement location could create a Doppler shift in the observed wave period and an associated change in observed wave speed, both of which are thought to be correctable by this module.

Figure 8:
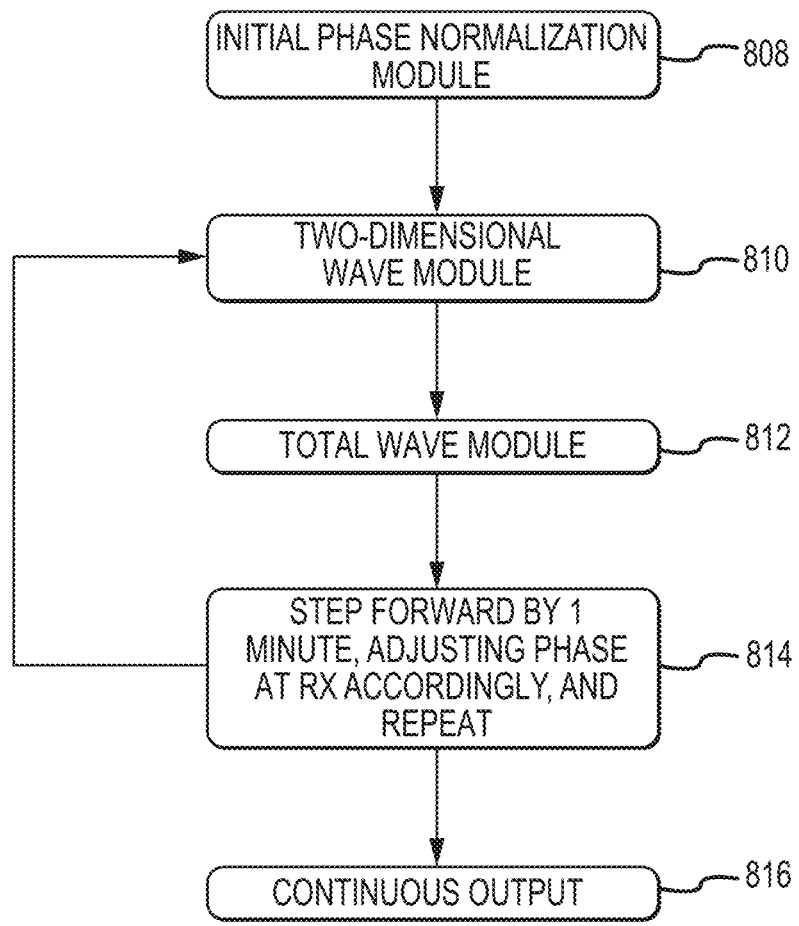
FIG. 8 illustrates an exemplary flowchart depicting processes performed by an exemplary output module according to an embodiment of the invention.
Figure 12A:
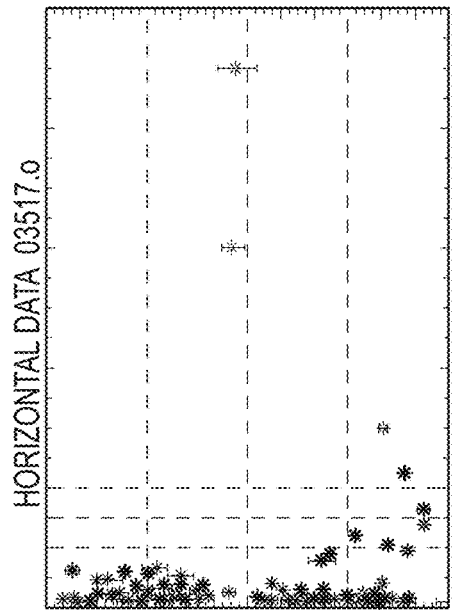
FIG. 12A illustrates a graphical representation of an output of module 412 of an example of the invention, the azimuth of each wave as a function of wave period.
Figure 12B:
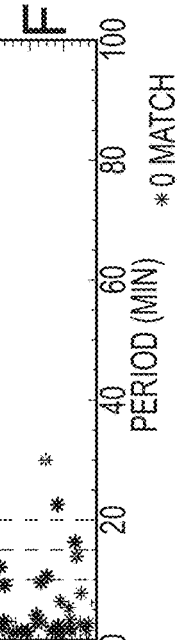
FIG. 12B illustrates a graphical representation of an output of module 412 of an example of the invention, the azimuth of each wave as a function of wave period, for a different operating frequency than that shown in FIG. 12A.
Figure 12C:
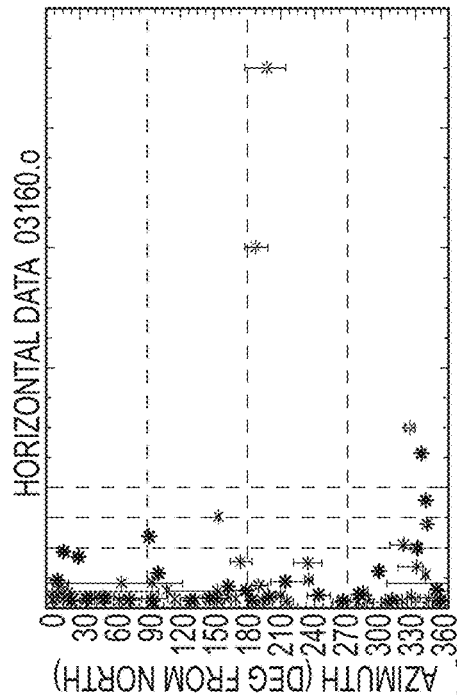
FIG. 12C illustrates a graphical representation of an output of module 412 of an example of the invention, the azimuth of each wave as a function of wave period, for a different propagation mode than that shown in FIG. 12A.
Figure 12D:
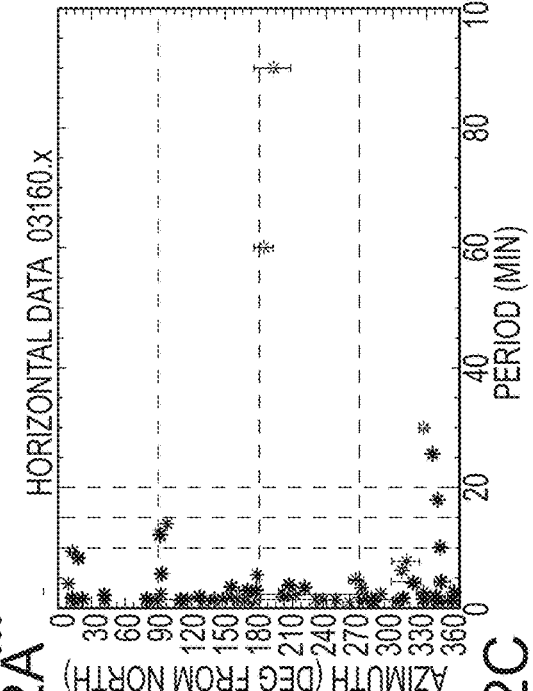
FIG. 12D illustrates a graphical representation of an output of module 412 of an example of the invention, the azimuth of each wave as a function of wave period, for a different frequency and propagation mode than that shown in FIG. 12A.
Figure 13A:
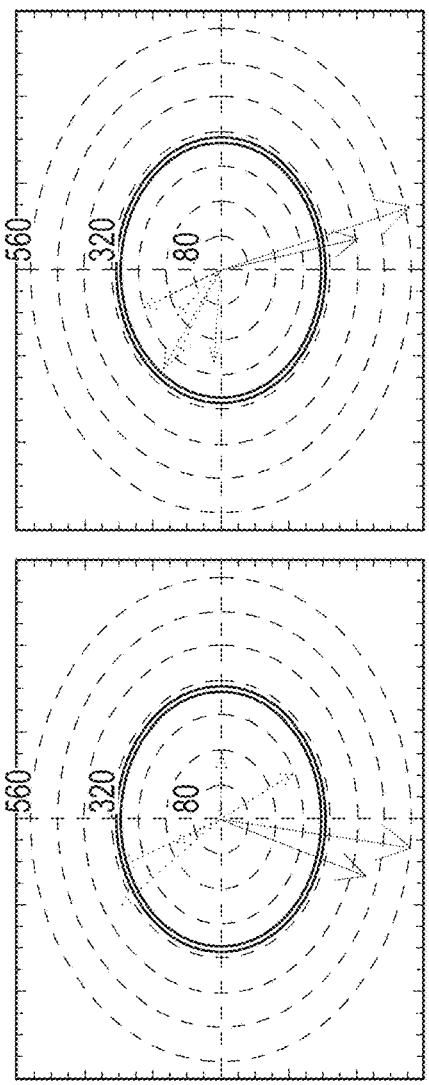
FIG. 13A illustrates a graphical representation of an output of module 414 of an example of the invention, the azimuth and speed of each wave, color coded by wave period, with waves that did not pass the filtering criteria drawn as dashed lines.
Figure 13B:
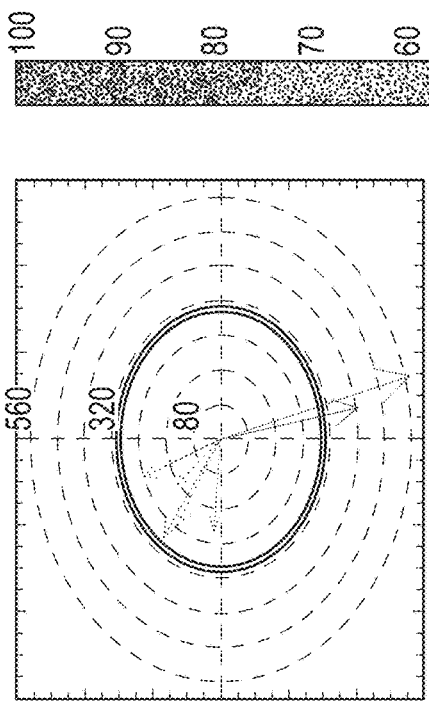
FIG. 13B illustrates a graphical representation of an output of module 414 of an example of the invention, the azimuth and speed of each wave, color coded by wave period, with waves that did not pass the filtering criteria drawn as dashed lines, for a different operating frequency than that shown in FIG. 13A.
Figure 13C:
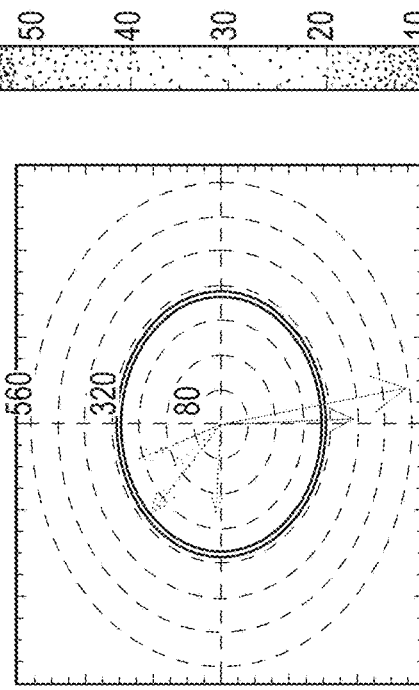
FIG. 13C illustrates a graphical representation of an output of module 414 of an example of the invention, the azimuth and speed of each wave, color coded by wave period, with waves that did not pass the filtering criteria drawn as dashed lines, for a different propagation mode than that shown in FIG. 13A.
Figure 13D:
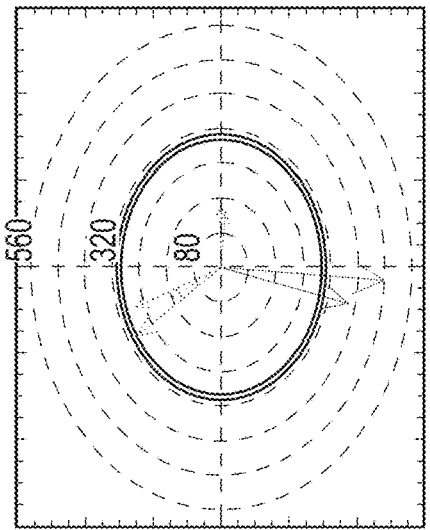
FIG. 13D illustrates a graphical representation of an output of module 414 of an example of the invention, the azimuth and speed of each wave, color coded by wave period, with waves that did not pass the filtering criteria drawn as dashed lines, for a different frequency and propagation mode than that shown in FIG. 13A.

A preferred embodiment of the output of module 418 is described in greater detail with reference to FIG. 8. FIG. 8 illustrates an exemplary flowchart depicting processes performed by an exemplary output program according to an embodiment of the invention. Referring to FIG. 8, a preferred embodiment for processing the data to generate a three dimensional map of the height perturbations experienced by an isoionic contour, caused by traveling ionospheric disturbances (TIDs) is illustrated. Modules 808 and 810 are performed for each valid wave period from module 414. In module 808 phase information from the data output from module 404 is combined with the azimuth and wavelength from module 412 to convert from initial phase at the reflection point to initial phase at the receiver for this wave. The three values for initial phase of this wave at the receiver are averaged together.

In module 810, the two-dimensional wave structure for the area surrounding the measurement system is calculated for each wave period in turn. In a preferred embodiment, the wavelength and azimuth from module 412, the average amplitude from module 404, and the average initial phase at the receiver from module 808 are combined using the equations below to generate the two-dimensional wave field around the receiver for this wave period at this time.

xloc=X location in the X/Y map around the receiver (receiver at 0), xloc has units of km, positive east of the receiver.

yloc=Y location in the X/Y map around the receiver (receiver at 0), yloc has units of km, positive north of the receiver.

amplitude=amplitude of the current wave from FFT. For an HF Doppler system, amplitude typically has units of km.

azimuth=azimuth angle of the current wave, azimuth has units of degrees.

period=period of the current wave, period has units of minutes.

wavelength=wavelength of the current wave, wavelength has units of km.

phases=initial phase from FFT for each transmitter, phases has units of degrees.

xmtrx=x coordinate of each ionospheric measurement location, xmtr_x has units of km, positive east of the receiver.

xmtr_y=y coordinate of each ionospheric measurement location, xmtr_y has units of km, positive north of the receiver.

toff=time since the start of the window, toff has units of minutes.

slope=−1*tan(azimuth), slope is unitless.

qx=(xloc/slope+yloc)/(slope+1/slope), qx has units of km.

qy=qx*slope, qy has units of km.

dx=xloc−qx, dx has units of km.

dy=yloc−qy, dy has units of km.

dist=sqrt((dx)^2+(dy)^2), dist has units of km.

angle=a tan(cbddy), angle has units of degrees if abs(angle−azimuth)<10 or abs(angle−azimuth)>350 then dist=dist*−1 qx2=(xmtr_x/slope+xmtr_y)/(slope+1/slope), qx2 has units of km.

qy2=qx2*slope, qy2 has units of km.

dx2=xmtr_x−qx2, dx2 has units of km.

dy2=xmtr_y−qy2, dy2 has units of km.

dist2=sqrt((dx2)^2+(dy2)^2), dist2 has units of km.

angle2=a tan(dx2/dy2), angle2 has units of degrees if abs(angle2−azimuth)<10 or abs(angle2−azimuth)>350 then dist2=dist2*−1 phase2=dist2*360./wavelength, phase2 has units of degrees.

phase_tot=average(phases+phase2), phase_tot has units of degrees.

new_dist=phase_tot/360.*wavelength, new_dist has units of km.

field=amplitude*sin(2*pi*(dist+new_dist)/wavelength+ 2*pi*toff/period), field has the same units as amplitude.

More specifically, module 810 is generating a two dimensional wave field around the receiver location using the amplitude, wavelength, azimuth, and initial phase of the current wave, assuming plane waves that extend to the edge of the domain of interest. Dist is the distance of each point in the field from the receiver location in the direction of wave travel. Dist2 is the distance of each measurement location from the receiver location in the direction of wave travel. Dist2 is used in combination with the wavelength and initial phase at each measurement location to estimate the initial phase at the receiver location from each of the measurements. These are averaged together to calculate a single initial phase at the receiver location, phase_tot. The initial phase at the receiver and the wavelength of the wave are then combined to convert the initial phase at the receiver from degrees to km. This is then added to dist to calculate the distance from each point in the two dimensional wave field from the receiver in the direction of wave travel, including the initial phase offset. This is then combined with the wavelength of the wave and the current time offset from the start of the window to calculate the wave field, stored in the array "field"

In module 812, the two dimensional wave fields for each valid wave period obtained from module 810 are superimposed, thereby allowing generation of a total wave field at the current time to generate a single frame output. More specifically, the loop (not shown) over wave periods sums the two dimensional wave field for every valid wave in the analysis, according to the following equation, where the summation is over wave periods from j=1 through j=N:

$$\text{total\_wave\_field} = \sum_{j=1}^{j=N} \text{field}_j$$

Figure 14:
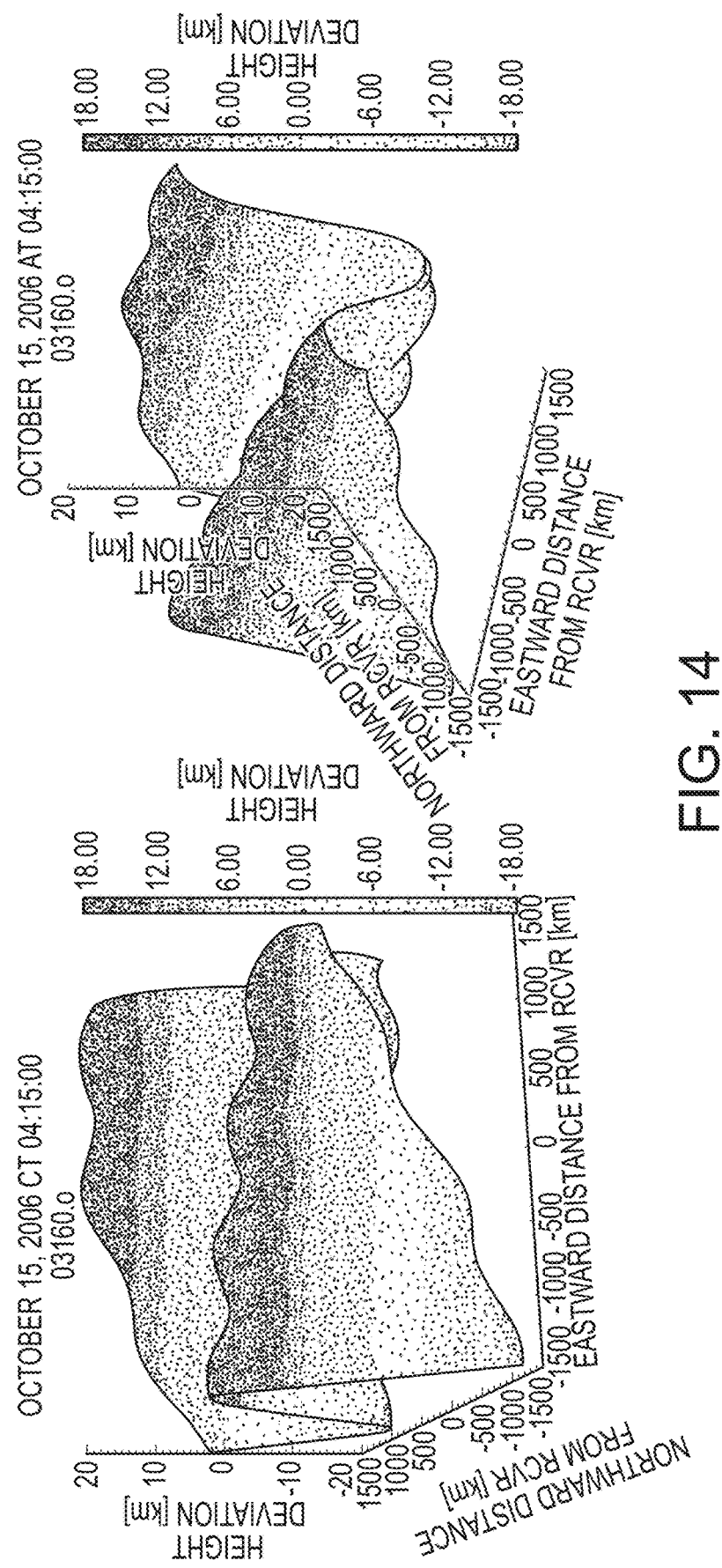
FIG. 14 illustrates a three-dimensional graphical output of three dimensional measurements of ionospheric perturbations according to an example of the invention.

The result of this summation may be outputted and/or stored in the database for further use or processing. This array can then be output in a variety of graphical forms, stored as data or a combination of the same, including the form shown in FIG. 14, which has a three dimensional appearance. In the case where the amplitude represents a height change, then the output field is truly a three dimensional representation of the height perturbations of an isoionic contour caused by the TIDs. An example of the resulting image can be output to any device.

In module 814, step forward by a predetermined amount of time, e.g., 1 minute or more, adjusting the phase of each wave at the receiver accordingly, and repeat by returning to module 810. This creates a new three dimensional map of the perturbations experienced by an isoionic contour at the next time-step. These maps can be played in sequence to represent a movie of the isoionic contour perturbations caused by the TIDs as they propagate over time.

In module 816, the individual frames are merged together into single continuous output for a predetermined time, e.g., 3-hour window or greater.

EXAMPLES

Without intending to limit the scope of the invention, the following examples illustrate how various embodiments of the invention may be made and/or used.

The experimental setup and data collected as described in Crowley and Rodrigues, "Characteristics of traveling ionospheric disturbances observed by TIDDBIT sounder" 2012, which is hereby incorporated by reference. The data from the Crowley paper was analyzed according to the flowchart in FIG. 8 and related text to generate a three dimensional map of the perturbations experienced by an isoionic contour, caused by traveling ionospheric disturbances (TIDs). The data is shown in Table 2:

TABLE 2

| | | Data | | |
|---|---|---|---|---|
| Period [min] | Wavelength [km] | Azimuth [deg E of N] | Amplitude [km] | Initial Phase [deg] |
| 29.99 | 629.6 | −34.4 | 1.43 | 189.1 |
| 59.98 | 2038.4 | −173.3 | 5.01 | 89.5 |
| 89.97 | 2398.8 | −162.7 | 12.20 | −90.5 |

FIG. 9A is a graphical representation of the Doppler shifts measured by an HF Doppler system for 15 Oct. 2006, 3.16 MHz ordinary polarization. FIG. 9B is a graphical representation of HF Doppler data for 15 Oct. 2006, 3.517 MHz ordinary polarization. FIG. 9C is a graphical representation of HF Doppler data for 15 Oct. 2006, 3.16 MHz extraordinary polarization. FIG. 9D is a graphical representation of HF Doppler data for 15 Oct. 2006, 3.517 MHz extraordinary polarization.

Referring to FIGS. 9A-9D, this data will be input into module 514 to change Doppler shifts to vertical velocity at the radio reflection height and integrated to obtain the change in reflection height versus time for each transmitted radio signal. The following equations were used in module 514 to determine the change in reflection height versus time:

c=299792458, c has units of [m/s].

xmtrF=transmitter broadcast frequency, xmtrF has units of [Hz].

dt=sample rate, which was about 27 seconds, dt has units of [s].

Doppler=Doppler shift measured by the system, Doppler has units of [Hz].

wavelength=c/xmtrF, wavelength has units of [m].

velocity=Doppler*wavelength/2, velocity has units of [m/s].

height=integral(velocity,dt), height has units of [m]

More specifically, what the system is measuring is the Doppler shift in the transmitted CW wave at the receiver. For near-vertical incidence systems like the one used here, this Doppler shift is introduced mainly by the motion of the ionospheric reflection point relative to the stationary transmitter and receiver. These equations represent the standard and well-understood relationship between relative velocity and observed Doppler shift. The velocity is divided by two to account for the doubling effect velocity has on Doppler shift in this setup, where the change in radio pathlength is approximately twice the change in ionospheric reflection height. This velocity is then integrated to produce a time series of ionospheric reflection height changes.

The output of module 514 is data that can be stored in a database of the system either at the receiver, base station, server, and/or cloud. The data includes a structure containing the fields required to perform the ensuing steps in the analysis, such as time stamps, background noise level, amplitude of the received signal, frequency of the received signal, and integrated height deviation of the received signal. This converted data is held in memory, database, and/or passed to modules 404-414.

In module 404, a fast Fourier transform (FFT) is computed on the height deviations from module 514 for each of the three transmitters and each of the four signals. Next, the output of the FFT is passed on to modules 406-412 to perform the cross spectral analysis to calculate wave azimuth, speed, and wavelength for each valid wave period in the FFT spectrum.

The output includes data having a combination of data structures containing, for each of the four signals and three transmitters, the following FFT Data fields and HORIZ Data: FFT Data: 1) Name of the signal; 2) The periods from the FFT on each transmitter; 3) The wave amplitude at each period in 2; 4) The initial phase of the wave at each period in 2; 5) Some housekeeping information including start and stop times of the windows and version numbers of the processing codes, and HORIZ Data including fields: 1) Name of the signal; 2) The periods from the FFT; 3) The speed of the wave at each period in 2; 4) The azimuth of the wave at each period in 2; 5) The wavelength of the wave at each period in 2; and 6) Some housekeeping information including estimated error in the speed, estimated error in the azimuth, start and stop times of the windows, and version numbers of the processing codes.

Next, the same rudimentary filtering is performed on the HORIZ Data and FFT Data using module 414 to remove wave information that does not pass the selectivity criteria. The output is graphically shown in FIGS. 13A-13D, which shows horizontal speed and azimuth vectors from a 3-hr data window spanning from 3-6 UT; the waves that passed the second selectivity test 414 have solid arrows, while the waves that failed the second selectivity test 414 have dashed arrows.

In module 808, the phase information from field 4 of the FFT data was combined with the azimuth and wavelength of the wave in fields 4 and 5 of HORIZ data to convert from initial phase at the reflection point to initial phase at the receiver for this wave. Next, the three values for initial phase at the receiver for this wave were averaged together. This data is stored in the database for use later on.

A single variable phase_tot which holds the initial phase of this wave at the receiver was combined with the rest of Data output from Module 414, and is passed to Module 810 for further analysis.

In Module 810, the initial phase of the data output from Module 808 was combined with the azimuth and wavelength information from Module 414 using the equation above to generate the 2D wave field in the domain of interest around the receiver for this wave period at this time.

Next, the output of module 810 was sent to module 812, where the loop over wave periods superposes the 2D wave field for every valid wave in the analysis, the result of which is stored in memory as an array labeled field. The output of Module 812 includes a single image (e.g., FIG. 14), which is saved in the database.

Modules 808, 810 and 812 were repeated 180 times (3 hours at 1-min timesteps). Each instance of the loop adjusts the initial phase of the waves by 1 minute, allowing a time-series of images to be generated.

Module 816 was now performed. In this module 816, all 180 images (3 hours at a 1 minute cadence) were generated by the loop for each of the four signals, and saved on the database. The individual frames from Module 816 were merged together to create an avi movie of the two dimensional wave field over a three hour time range and saved on the database, e.g., FIG. 14 for a single frame of the graphical output. In this case, where the amplitude represents a height change, then the output field is truly a three dimensional representation of the height perturbations of an iso-ionic contour caused by the TIDs.

The inventions and methods described herein can be viewed as a whole, or as a number of separate inventions, that can be used independently or mixed and matched as desired. All inventions, embodiments, steps, processed, devices, and methods described herein can be mixed and matched as desired. All previously described features, functions, or inventions described herein or by reference may be mixed and matched as desired.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A cloud based storage medium tangibly embodying a program of instructions executable by a machine wherein said program of instruction comprises a plurality of program codes for determining real time three dimensional characteristics of traveling ionospheric disturbances (TIDs) said program of instructions, comprising:
   program code for performing normalization on each measured wave period;
   program code for generating a two-dimensional wave structure for a first period of time;
   program code for generating a total wave field for the first period of time;
   program code for storing total wave field for the first period of time;
   program code for incrementing by a predetermined time and repeat generating steps for a second period of time; and
   program code for merging total wave field from the first period of time with the second period of time.

2. The program of instructions of claim 1, further comprising program code for generating a three dimensional graphical mapping of corresponding ionospheric perturbations.

3. The program of instructions of claim 2, further comprising program code for displaying the three dimensional graphical mapping.

4. The program of instructions of claim 1, wherein the program code is located on a network.

5. The program of instructions of claim 1, wherein the program code is located in the cloud.

6. A computer system for determining real time three dimensional characteristics of traveling ionospheric disturbances (TIDs), the computer system comprising:
   a machine capable of executing instructions embodied as software; and
   a plurality of software portions, wherein
   one of said software portions is configured to normalize on each measured wave period;
   one of said software portions is configured to generate a two-dimensional wave structure for a first period of time;
   one of said software portions is configured to generate a total wave field for the first period of time;
   one of said software portions is configured to store a total wave field for the first period of time;
   one of said software portions is configured to increment by a predetermined time and repeat generating steps for a second period of time; and
   one of said software portions is configured to merge a total wave field from the first period of time with the second period of time.

7. The computer system of claim 6, further comprising program code for generating a three dimensional graphical mapping of corresponding ionospheric perturbations.

8. The computer system of claim 7, further comprising program code for displaying the three dimensional graphical mapping.

* * * * *